(12) United States Patent
Short et al.

(10) Patent No.: US 8,190,708 B1
(45) Date of Patent: May 29, 2012

(54) GATEWAY DEVICE HAVING AN XML INTERFACE AND ASSOCIATED METHOD

(75) Inventors: Joel E. Short, Los Angeles, CA (US); Ray S. Ewan, West Hollywood, CA (US); Jerome Sorcsek, Granada Hills, CA (US)

(73) Assignee: NOMADIX, Inc., Agoura Hills, CA (US)

( * ) Notice: Subject to any disclaimer, the term of this patent is extended or adjusted under 35 U.S.C. 154(b) by 2292 days.

(21) Appl. No.: 09/693,512

(22) Filed: Oct. 20, 2000

Related U.S. Application Data

(60) Provisional application No. 60/161,181, filed on Oct. 22, 1999.

(51) Int. Cl.
*G06F 15/16* (2006.01)

(52) U.S. Cl. .......................... 709/219; 715/234

(58) Field of Classification Search ............... 705/26.62; 715/234; 707/102; 709/223, 250
See application file for complete search history.

(56) References Cited

U.S. PATENT DOCUMENTS

| | | | |
|---|---|---|---|
| 4,677,588 A | 6/1987 | Benjamin | |
| 4,811,011 A | 3/1989 | Sollinger | |
| 5,065,393 A | 11/1991 | Sibbitt | |
| 5,124,984 A | 6/1992 | Engel | |
| 5,142,622 A | 8/1992 | Owens | |
| 5,166,931 A | 11/1992 | Riddle | |
| 5,185,860 A | 2/1993 | Wu | |
| 5,218,605 A * | 6/1993 | Low et al. ..................... 714/45 |
| 5,258,906 A | 11/1993 | Kroll | |
| 5,293,488 A | 3/1994 | Riley | |
| 5,329,619 A | 7/1994 | Page | |
| 5,369,705 A | 11/1994 | Bird | |
| 5,406,555 A | 4/1995 | Yoshida | |
| 5,420,862 A | 5/1995 | Perlman | |
| 5,481,542 A | 1/1996 | Logston | |
| 5,490,252 A | 2/1996 | Macera | |
| 5,526,489 A | 6/1996 | Nilakantan | |

(Continued)

FOREIGN PATENT DOCUMENTS

AU 2003255101 3/2004

(Continued)

OTHER PUBLICATIONS

Alain Michard, Vassilis Christophides, Michel Scholl, Mike Stapleton, Dale Sutcliffe, Anne-Marie Vercoustre; The Aquarelle resource discovery system; *Computer Networks and ISDN Systems*; 1998; pp. 1185-1200; vol. 30, NR. 13; North Holland Publishing; Amsterdam, NL; XP004147404; ISSN: 0169-7552.

(Continued)

*Primary Examiner* — Dustin Nguyen
(74) *Attorney, Agent, or Firm* — Knobbe, Martens, Olson & Bear, LLP

(57) ABSTRACT

A gateway device and associated method are provided that facilitate communications with external devices by utilizing a uniform communications format. The gateway device includes a subscriber interface for adapting to a subscriber computer that is connected to the gateway device. The subscriber interface facilitates communications between the subscriber computer and at least one network or on-line service without requiring the subscriber computer to be reconfigured and without requiring the subscriber computer to support XML commands and responses. The gateway device also includes an XML interface for communicating with an external device via a series of XML commands and responses. The XML commands and responses can relate to a variety of matters, including various subscriber management matters.

15 Claims, 6 Drawing Sheets

U.S. PATENT DOCUMENTS

| | | |
|---|---|---|
| 5,533,026 A | 7/1996 | Ahmadi |
| 5,548,646 A | 8/1996 | Aziz |
| 5,550,984 A | 8/1996 | Gelb |
| 5,553,223 A | 9/1996 | Greenlee et al. |
| 5,574,779 A | 11/1996 | Ely |
| 5,583,864 A | 12/1996 | Lightfoot |
| 5,592,537 A | 1/1997 | Moen |
| 5,598,536 A | 1/1997 | Slaughter |
| 5,604,896 A | 2/1997 | Duxbury |
| 5,606,668 A | 2/1997 | Shwed |
| 5,613,090 A * | 3/1997 | Willems .................. 719/329 |
| 5,615,339 A | 3/1997 | Ban |
| 5,617,540 A | 4/1997 | Civanlar et al. |
| 5,623,600 A | 4/1997 | Ji et al. |
| 5,633,999 A | 5/1997 | Clowes |
| 5,636,371 A | 6/1997 | Yu |
| 5,644,719 A | 7/1997 | Aridas |
| 5,649,001 A | 7/1997 | Thomas |
| 5,652,908 A | 7/1997 | Douglas |
| 5,657,452 A | 8/1997 | Kralowetz |
| 5,659,684 A | 8/1997 | Giovannoni |
| 5,664,102 A | 9/1997 | Faynberg |
| 5,678,041 A | 10/1997 | Baker |
| 5,696,899 A | 12/1997 | Kalwitz |
| 5,699,520 A | 12/1997 | Hodgson |
| 5,708,654 A | 1/1998 | Arndt |
| 5,717,737 A | 2/1998 | Doviak |
| 5,724,510 A | 3/1998 | Arndt |
| 5,745,699 A | 4/1998 | Lunn et al. |
| 5,751,961 A | 5/1998 | Smyk |
| 5,757,784 A | 5/1998 | Liebowitz |
| 5,757,924 A | 5/1998 | Friedman et al. |
| 5,758,083 A | 5/1998 | Singh et al. |
| 5,758,186 A | 5/1998 | Hamilton |
| 5,764,890 A | 6/1998 | Glasser |
| 5,774,668 A | 6/1998 | Choquier |
| 5,774,869 A | 6/1998 | Toader |
| 5,790,548 A | 8/1998 | Sistanizadeh |
| 5,793,762 A | 8/1998 | Penners et al. |
| 5,794,221 A | 8/1998 | Egendorf |
| 5,796,952 A | 8/1998 | Davis et al. |
| 5,802,047 A | 9/1998 | Kinoshita |
| 5,802,285 A | 9/1998 | Hirviniemi |
| 5,802,310 A | 9/1998 | Rajaraman |
| 5,805,803 A | 9/1998 | Birrell |
| 5,806,043 A | 9/1998 | Toader |
| 5,812,786 A | 9/1998 | Seazholtz |
| 5,812,819 A | 9/1998 | Rodwin |
| 5,815,664 A | 9/1998 | Asano |
| 5,818,845 A | 10/1998 | Moura et al. |
| 5,832,229 A | 11/1998 | Tomoda |
| 5,835,061 A | 11/1998 | Stewart |
| 5,835,720 A | 11/1998 | Nelson et al. |
| 5,835,724 A | 11/1998 | Smith |
| 5,835,725 A | 11/1998 | Chiang |
| 5,835,727 A | 11/1998 | Wong |
| 5,844,973 A | 12/1998 | Venkatraman |
| 5,848,233 A | 12/1998 | Radia |
| 5,856,974 A | 1/1999 | Gervais |
| 5,862,325 A | 1/1999 | Reed et al. |
| 5,862,328 A | 1/1999 | Colyer |
| 5,864,683 A | 1/1999 | Boebert |
| 5,881,234 A | 3/1999 | Schwob |
| 5,884,035 A | 3/1999 | Butman |
| 5,889,958 A | 3/1999 | Willens |
| 5,894,321 A | 4/1999 | Downs |
| 5,894,479 A | 4/1999 | Mohammed |
| 5,901,287 A | 5/1999 | Bull et al. |
| 5,903,732 A | 5/1999 | Reed |
| 5,909,441 A | 6/1999 | Alexander, Jr. et al. |
| 5,915,093 A | 6/1999 | Berlin |
| 5,916,302 A | 6/1999 | Dunn |
| 5,918,018 A | 6/1999 | Gooderum |
| 5,922,049 A | 7/1999 | Radia |
| 5,923,853 A | 7/1999 | Danneels |
| 5,930,255 A | 7/1999 | Tsukamoto et al. |
| 5,931,917 A | 8/1999 | Nguyen |
| 5,940,394 A | 8/1999 | Killian |
| 5,941,947 A | 8/1999 | Brown |
| 5,941,988 A | 8/1999 | Bhagwat |
| 5,946,687 A | 8/1999 | Gehani |
| 5,949,875 A | 9/1999 | Walker |
| 5,951,694 A | 9/1999 | Choquier |
| 5,958,015 A | 9/1999 | Dascalu |
| 5,958,018 A | 9/1999 | Eng |
| 5,968,126 A | 10/1999 | Ekstrom |
| 5,969,678 A | 10/1999 | Stewart |
| 5,970,490 A * | 10/1999 | Morgenstern .................. 707/10 |
| 5,982,773 A | 11/1999 | Nishimura |
| 5,987,523 A | 11/1999 | Hind |
| 5,987,611 A | 11/1999 | Freund |
| 5,999,536 A | 12/1999 | Kawafuji |
| 5,999,912 A | 12/1999 | Wodraz |
| 6,006,258 A | 12/1999 | Kalajan |
| 6,011,782 A | 1/2000 | DeSimone |
| 6,012,083 A | 1/2000 | Savitzky |
| 6,018,771 A | 1/2000 | Hayden |
| 6,028,848 A | 2/2000 | Bhatia |
| 6,035,281 A | 3/2000 | Crosskey e |
| 6,038,233 A | 3/2000 | Hamamoto |
| 6,044,062 A | 3/2000 | Brownrigg |
| 6,055,236 A | 4/2000 | Nessett |
| 6,055,243 A | 4/2000 | Vincent |
| 6,058,418 A | 5/2000 | Kobata |
| 6,061,349 A | 5/2000 | Coile |
| 6,061,650 A | 5/2000 | Malkin |
| 6,061,668 A | 5/2000 | Sharrow |
| 6,061,739 A | 5/2000 | Reed |
| 6,064,674 A | 5/2000 | Doidge et al. |
| 6,070,191 A | 5/2000 | Narendran et al. |
| 6,070,243 A | 5/2000 | See |
| 6,073,160 A | 6/2000 | Grantham |
| 6,073,175 A | 6/2000 | Tavs |
| 6,088,451 A | 7/2000 | He |
| 6,088,725 A | 7/2000 | Kondo et al. |
| 6,091,732 A | 7/2000 | Alexander |
| 6,092,196 A | 7/2000 | Reiche |
| 6,094,659 A | 7/2000 | Bhatia |
| 6,101,543 A | 8/2000 | Alden |
| 6,108,330 A | 8/2000 | Bhatia |
| 6,112,239 A | 8/2000 | Kenner et al. |
| 6,115,376 A | 9/2000 | Sherer et al. |
| 6,115,545 A | 9/2000 | Mellquist |
| 6,119,161 A | 9/2000 | Lita et al. |
| 6,122,268 A | 9/2000 | Okanoue |
| 6,128,298 A | 10/2000 | Wootton |
| 6,128,601 A | 10/2000 | Van Horne et al. |
| 6,130,892 A | 10/2000 | Short et al. |
| 6,137,791 A | 10/2000 | Frid |
| 6,137,869 A | 10/2000 | Voit |
| 6,138,142 A | 10/2000 | Linsk |
| 6,138,144 A | 10/2000 | DeSimone |
| 6,138,162 A | 10/2000 | Pistriotto et al. |
| 6,141,010 A | 10/2000 | Hoyle |
| 6,141,653 A | 10/2000 | Conklin |
| 6,141,686 A | 10/2000 | Jackowski et al. |
| 6,141,690 A | 10/2000 | Weiman |
| 6,144,991 A | 11/2000 | England |
| 6,147,976 A | 11/2000 | Shand |
| 6,148,336 A | 11/2000 | Thomas et al. |
| 6,154,172 A | 11/2000 | Piccionelli |
| 6,154,764 A | 11/2000 | Nitta |
| 6,154,775 A | 11/2000 | Coss |
| 6,154,839 A | 11/2000 | Arrow |
| 6,157,377 A | 12/2000 | Shah-Nazaroff |
| 6,157,647 A | 12/2000 | Husak |
| 6,157,925 A | 12/2000 | Jenkins et al. |
| 6,157,953 A | 12/2000 | Chang |
| 6,158,008 A | 12/2000 | Maria |
| 6,160,874 A | 12/2000 | Dickerman |
| 6,166,730 A | 12/2000 | Goode |
| 6,167,513 A | 12/2000 | Inoue |
| 6,173,322 B1 | 1/2001 | Hu |
| 6,175,869 B1 | 1/2001 | Ahuia et al. |
| 6,182,154 B1 | 1/2001 | Campagnoni |
| 6,189,030 B1 | 2/2001 | Kirsch et al. |
| 6,194,992 B1 | 2/2001 | Short et al. |

| Patent | Type | Date | Name | Class |
|---|---|---|---|---|
| 6,199,100 | B1 | 3/2001 | Filepp | |
| 6,201,962 | B1 | 3/2001 | Sturniolo | |
| 6,202,169 | B1 | 3/2001 | Razzaghe-Ashrafi | |
| 6,205,148 | B1 | 3/2001 | Takahashi | |
| 6,205,481 | B1 | 3/2001 | Heddaya | |
| 6,219,786 | B1 | 4/2001 | Cunningham | |
| 6,219,790 | B1 | 4/2001 | Lloyd | |
| 6,223,205 | B1 | 4/2001 | Harchol-Balter et al. | |
| 6,223,286 | B1 | 4/2001 | Hashimoto | |
| 6,226,675 | B1* | 5/2001 | Meltzer et al. | 709/223 |
| 6,233,618 | B1 | 5/2001 | Shannon | |
| 6,233,686 | B1 | 5/2001 | Zenchelsky | |
| 6,237,026 | B1 | 5/2001 | Prasad | |
| 6,237,037 | B1 | 5/2001 | Larsson | |
| 6,240,091 | B1 | 5/2001 | Ginzboorg | |
| 6,240,402 | B1 | 5/2001 | Lynch-Aird | |
| 6,240,513 | B1 | 5/2001 | Friedman | |
| 6,240,533 | B1 | 5/2001 | Slemmer | |
| 6,243,379 | B1 | 6/2001 | Veerina et al. | |
| 6,247,054 | B1 | 6/2001 | Malkin | |
| 6,249,820 | B1 | 6/2001 | Dobbins | |
| 6,256,307 | B1 | 7/2001 | Salmonson | |
| 6,259,405 | B1 | 7/2001 | Stewart | |
| 6,266,335 | B1 | 7/2001 | Bhaskaran | |
| 6,282,180 | B1 | 8/2001 | Paneth | |
| 6,288,739 | B1 | 9/2001 | Hales | |
| 6,292,478 | B1 | 9/2001 | Farris | |
| 6,295,291 | B1 | 9/2001 | Larkins | |
| 6,298,383 | B1 | 10/2001 | Gutman | |
| 6,304,857 | B1 | 10/2001 | Heindel | |
| 6,308,212 | B1 | 10/2001 | Besaw | |
| 6,311,275 | B1 | 10/2001 | Jin | |
| 6,321,336 | B1 | 11/2001 | Applegate | |
| 6,326,918 | B1 | 12/2001 | Stewart | |
| 6,327,242 | B1 | 12/2001 | Amicangioli et al. | |
| 6,330,586 | B1 | 12/2001 | Yates | |
| 6,345,291 | B2 | 2/2002 | Murphy, Jr. et al. | |
| 6,345,303 | B1* | 2/2002 | Knauerhase et al. | 709/238 |
| 6,359,892 | B1 | 3/2002 | Szlam | |
| 6,366,893 | B2 | 4/2002 | Hannula | |
| 6,377,982 | B1 | 4/2002 | Rai | |
| 6,381,646 | B2 | 4/2002 | Zhang | |
| 6,381,650 | B1 | 4/2002 | Peacock | |
| 6,385,644 | B1* | 5/2002 | Devine et al. | 709/206 |
| 6,385,653 | B1 | 5/2002 | Sitaraman et al. | |
| 6,389,462 | B1 | 5/2002 | Cohen | |
| 6,393,484 | B1 | 5/2002 | Massarani | |
| 6,397,255 | B1 | 5/2002 | Nurenberg et al. | |
| 6,408,336 | B1 | 6/2002 | Schneider | |
| 6,412,073 | B1 | 6/2002 | Rangan | |
| 6,414,635 | B1 | 7/2002 | Stewart et al. | |
| 6,418,324 | B1 | 7/2002 | Doviak | |
| 6,424,636 | B1 | 7/2002 | Seazholtz | |
| 6,427,170 | B1 | 7/2002 | Sitaraman | |
| 6,434,627 | B1 | 8/2002 | Millet et al. | |
| 6,438,125 | B1 | 8/2002 | Brothers | |
| 6,438,528 | B1 | 8/2002 | Jensen | |
| 6,438,578 | B1 | 8/2002 | Schmid | |
| 6,452,498 | B2 | 9/2002 | Stewart | |
| 6,453,353 | B1 | 9/2002 | Win | |
| 6,453,361 | B1* | 9/2002 | Morris | 709/250 |
| 6,463,473 | B1 | 10/2002 | Gubbi | |
| 6,463,474 | B1 | 10/2002 | Fuh | |
| 6,466,076 | B2 | 10/2002 | Yoshikawa | |
| 6,466,976 | B1 | 10/2002 | Alles | |
| 6,466,981 | B1 | 10/2002 | Levy | |
| 6,466,986 | B1 | 10/2002 | Sawyer et al. | |
| 6,470,027 | B1 | 10/2002 | Birrell | |
| 6,470,386 | B1 | 10/2002 | Combar | |
| 6,473,411 | B1 | 10/2002 | Kumaki | |
| 6,480,486 | B2 | 11/2002 | Kikinis | |
| 6,487,538 | B1 | 11/2002 | Gupta | |
| 6,487,605 | B1 | 11/2002 | Leung | |
| 6,496,704 | B2 | 12/2002 | Yuan | |
| 6,515,968 | B1* | 2/2003 | Combar et al. | 370/252 |
| 6,515,989 | B1 | 2/2003 | Ronneke | |
| 6,516,416 | B2 | 2/2003 | Gregg et al. | |
| 6,519,636 | B2 | 2/2003 | Engel | |
| 6,519,643 | B1 | 2/2003 | Foulkes | |
| 6,523,028 | B1 | 2/2003 | DiDomizio | |
| 6,535,493 | B1 | 3/2003 | Lee et al. | |
| 6,535,511 | B1 | 3/2003 | Rao | |
| 6,539,395 | B1* | 3/2003 | Gjerdingen et al. | 707/102 |
| 6,546,392 | B1 | 4/2003 | Bahlmann | |
| 6,546,425 | B1 | 4/2003 | Hanson et al. | |
| 6,549,220 | B1 | 4/2003 | Hsu | |
| 6,553,178 | B2 | 4/2003 | Abecassis | |
| 6,557,038 | B1 | 4/2003 | Becker | |
| 6,571,221 | B1 | 5/2003 | Stewart | |
| 6,574,664 | B1 | 6/2003 | Liu | |
| 6,577,642 | B1 | 6/2003 | Fijolek | |
| 6,578,078 | B1 | 6/2003 | Smith et al. | |
| 6,580,717 | B1 | 6/2003 | Higuchi | |
| 6,584,505 | B1 | 6/2003 | Howard | |
| 6,587,880 | B1 | 7/2003 | Saigo | |
| 6,591,306 | B1 | 7/2003 | Redlich | |
| 6,597,693 | B1 | 7/2003 | Leung | |
| 6,601,065 | B1* | 7/2003 | Nelson et al. | 707/4 |
| 6,609,154 | B1 | 8/2003 | Fuh | |
| 6,615,212 | B1* | 9/2003 | Dutta et al. | 707/10 |
| 6,622,128 | B1* | 9/2003 | Bedell et al. | 705/30 |
| 6,625,645 | B1 | 9/2003 | Van Horne | |
| 6,626,957 | B1* | 9/2003 | Lippert et al. | 715/234 |
| 6,633,899 | B1 | 10/2003 | Coward | |
| 6,636,504 | B1 | 10/2003 | Albers | |
| 6,636,894 | B1 | 10/2003 | Short et al. | |
| 6,643,701 | B1 | 11/2003 | Aziz et al. | |
| 6,658,625 | B1* | 12/2003 | Allen | 715/523 |
| 6,665,718 | B1 | 12/2003 | Chuah | |
| 6,667,968 | B1 | 12/2003 | Tran | |
| 6,671,379 | B2 | 12/2003 | Nemirovski | |
| 6,671,739 | B1 | 12/2003 | Reed | |
| 6,687,732 | B1 | 2/2004 | Bector | |
| 6,697,018 | B2 | 2/2004 | Stewart | |
| 6,697,103 | B1* | 2/2004 | Fernandez et al. | 348/143 |
| 6,701,350 | B1 | 3/2004 | Mitchell | |
| 6,701,361 | B1 | 3/2004 | Meier | |
| 6,711,146 | B2 | 3/2004 | Yegoshin | |
| 6,714,987 | B1 | 3/2004 | Amin | |
| 6,717,943 | B1 | 4/2004 | Schwering | |
| 6,728,884 | B1 | 4/2004 | Lim | |
| 6,731,612 | B1 | 5/2004 | Koss | |
| 6,732,176 | B1 | 5/2004 | Stewart | |
| 6,735,633 | B1 | 5/2004 | Welch et al. | |
| 6,735,691 | B1 | 5/2004 | Capps | |
| 6,738,382 | B1 | 5/2004 | West | |
| 6,751,677 | B1 | 6/2004 | Ilnicki | |
| 6,757,740 | B1 | 6/2004 | Parekh et al. | |
| 6,759,960 | B2 | 7/2004 | Stewart | |
| 6,760,416 | B1 | 7/2004 | Banks | |
| 6,760,444 | B1 | 7/2004 | Leung | |
| 6,771,609 | B1 | 8/2004 | Gudat et al. | |
| 6,771,661 | B1 | 8/2004 | Chawla | |
| 6,775,267 | B1 | 8/2004 | Kung | |
| 6,779,035 | B1 | 8/2004 | Gbadegesin | |
| 6,785,704 | B1 | 8/2004 | McCanne | |
| 6,789,110 | B1 | 9/2004 | Short | |
| 6,795,852 | B1 | 9/2004 | Kleinrock et al. | |
| 6,810,426 | B2 | 10/2004 | Mysore et al. | |
| 6,822,954 | B2 | 11/2004 | McConnell et al. | |
| 6,822,955 | B1 | 11/2004 | Brothers | |
| 6,823,059 | B2 | 11/2004 | Kalmanek | |
| 6,826,694 | B1 | 11/2004 | Dutta et al. | |
| 6,834,341 | B1 | 12/2004 | Bahl | |
| 6,839,757 | B1 | 1/2005 | Romano | |
| 6,850,532 | B1 | 2/2005 | Thubert | |
| 6,856,800 | B1 | 2/2005 | Henry et al. | |
| 6,857,009 | B1 | 2/2005 | Ferreria et al. | |
| 6,859,212 | B2* | 2/2005 | Kumar et al. | 715/744 |
| 6,868,399 | B1 | 3/2005 | Short et al. | |
| 6,876,668 | B1 | 4/2005 | Chawla | |
| 6,892,226 | B1 | 5/2005 | Tso | |
| 6,901,433 | B2 | 5/2005 | San Andres | |
| 6,907,449 | B2 | 6/2005 | Srinivasan | |
| 6,915,345 | B1 | 7/2005 | Tummala | |
| 6,922,672 | B1 | 7/2005 | Hailpern | |
| 6,934,754 | B2 | 8/2005 | West et al. | |
| 6,937,597 | B1 | 8/2005 | Rosenberg et al. | |

| | | |
|---|---|---|
| 6,944,661 B2 | 9/2005 | Moore et al. |
| 6,947,398 B1 | 9/2005 | Ahmed |
| 6,950,433 B1 | 9/2005 | Okamoto |
| 6,950,628 B1 | 9/2005 | Meier et al. |
| 6,961,762 B1 | 11/2005 | Yeap |
| 6,970,927 B1 | 11/2005 | Stewart |
| 6,983,327 B2 | 1/2006 | Koperda |
| 6,985,479 B2 | 1/2006 | Leung et al. |
| 6,996,073 B2 | 2/2006 | West |
| 7,003,578 B2 | 2/2006 | Kanada et al. |
| 7,007,080 B2 | 2/2006 | Wilson |
| 7,009,556 B2 | 3/2006 | Stewart |
| 7,016,960 B2 | 3/2006 | Howard |
| 7,017,046 B2 * | 3/2006 | Doyle et al. ............... 713/178 |
| 7,020,082 B2 | 3/2006 | Bhagavath et al. |
| 7,020,681 B1 * | 3/2006 | Ayyagari et al. ............ 709/203 |
| 7,032,243 B2 | 4/2006 | Leerssen et al. |
| 7,035,248 B2 | 4/2006 | Wengrovitz |
| 7,043,532 B1 * | 5/2006 | Humpleman et al. ........ 709/208 |
| 7,043,563 B2 | 5/2006 | Vange et al. |
| 7,047,415 B2 * | 5/2006 | Doyle et al. ............... 713/178 |
| 7,051,087 B1 | 5/2006 | Bahl et al. |
| 7,058,594 B2 | 6/2006 | Stewart |
| 7,072,056 B1 | 7/2006 | Greaves et al. |
| 7,080,077 B2 | 7/2006 | Ramamurthy |
| 7,086,077 B2 | 8/2006 | Giammaressi |
| 7,088,727 B1 | 8/2006 | Short et al. |
| 7,093,020 B1 | 8/2006 | McCarty et al. |
| 7,117,526 B1 | 10/2006 | Short |
| 7,120,678 B2 | 10/2006 | Greuel |
| 7,120,701 B2 | 10/2006 | Warrier et al. |
| 7,124,437 B2 | 10/2006 | Byrne |
| 7,126,915 B1 | 10/2006 | Lu |
| 7,139,268 B1 | 11/2006 | Bhagwat |
| 7,145,898 B1 | 12/2006 | Elliott |
| 7,151,758 B2 | 12/2006 | Kumaki |
| 7,159,035 B2 | 1/2007 | Garcia-Luna-Aceves |
| 7,185,360 B1 | 2/2007 | Anton et al. |
| 7,188,085 B2 | 3/2007 | Pelletier |
| 7,194,554 B1 | 3/2007 | Short |
| 7,197,556 B1 | 3/2007 | Short et al. |
| 7,200,578 B2 * | 4/2007 | Paltenghe et al. ............. 705/74 |
| 7,210,035 B2 * | 4/2007 | Doyle et al. ................. 713/157 |
| 7,216,043 B2 | 5/2007 | Ransom et al. |
| 7,216,152 B2 | 5/2007 | Short et al. |
| 7,225,249 B1 | 5/2007 | Barry |
| 7,240,106 B2 | 7/2007 | Cochran et al. |
| 7,269,653 B2 | 9/2007 | Mentze et al. |
| 7,272,639 B1 | 9/2007 | Levergood et al. |
| 7,283,542 B2 | 10/2007 | Mitchell |
| 7,287,071 B2 | 10/2007 | MacLean |
| 7,289,763 B2 | 10/2007 | Denninson et al. |
| 7,293,077 B1 | 11/2007 | Teo |
| 7,313,631 B1 | 12/2007 | Sesmun et al. |
| 7,319,673 B1 | 1/2008 | Briscoe |
| 7,324,972 B1 | 1/2008 | Oliver |
| 7,325,063 B2 | 1/2008 | Dillon |
| 7,333,500 B2 | 2/2008 | Roshko |
| 7,333,942 B1 * | 2/2008 | Cowles ...................... 705/26.62 |
| 7,336,960 B2 | 2/2008 | Zavalkovsky et al. |
| 7,349,982 B2 | 3/2008 | Hannum et al. |
| 7,356,841 B2 | 4/2008 | Wilson et al. |
| 7,376,113 B2 | 5/2008 | Taylor et al. |
| 7,401,120 B2 | 7/2008 | Walbeck |
| 7,428,413 B2 | 9/2008 | Fink |
| 7,437,474 B2 | 10/2008 | Iyer et al. |
| 7,457,397 B1 * | 11/2008 | Saylor et al. ............... 379/88.17 |
| 7,472,191 B2 | 12/2008 | Stewart |
| 7,474,617 B2 | 1/2009 | Molen et al. |
| 7,483,871 B2 * | 1/2009 | Herz ............................. 1/1 |
| 7,493,084 B2 | 2/2009 | Meier et al. |
| 7,493,402 B2 | 2/2009 | McCarty et al. |
| 7,512,136 B2 | 3/2009 | Korotin |
| 7,526,538 B2 | 4/2009 | Wilson |
| 7,536,714 B2 | 5/2009 | Yuan |
| 7,539,291 B2 | 5/2009 | D'Angelo et al. |
| 7,552,090 B1 | 6/2009 | Barber |
| 7,554,995 B2 | 6/2009 | Short |
| 7,555,542 B1 | 6/2009 | Ayers et al. |
| 7,580,376 B2 | 8/2009 | West |
| 7,602,782 B2 | 10/2009 | Doviak |
| 7,685,311 B2 | 3/2010 | Friedman et al. |
| 7,685,525 B2 * | 3/2010 | Kumar et al. ................. 715/744 |
| 7,689,716 B2 | 3/2010 | Short et al. |
| 7,698,377 B2 | 4/2010 | Parekh et al. |
| 7,698,432 B2 | 4/2010 | Short et al. |
| 7,734,541 B2 * | 6/2010 | Kumar et al. .................. 705/39 |
| 7,739,383 B1 | 6/2010 | Short et al. |
| 7,743,404 B1 | 6/2010 | Deutschmann et al. |
| 7,752,334 B2 | 7/2010 | Paunikar et al. |
| 7,774,612 B1 | 8/2010 | Deutschmann et al. |
| 7,813,741 B2 | 10/2010 | Hendrey et al. |
| 7,818,454 B2 | 10/2010 | Kim et al. |
| 7,822,871 B2 | 10/2010 | Stolorz et al. |
| 7,822,873 B1 | 10/2010 | Paunikar |
| 7,844,729 B1 | 11/2010 | Friedman et al. |
| 7,953,857 B2 | 5/2011 | Short et al. |
| 8,051,206 B2 | 11/2011 | Paunikar et al. |
| 2001/0003823 A1 | 6/2001 | Mighdoll et al. |
| 2001/0012282 A1 | 8/2001 | Yegoshin |
| 2001/0041571 A1 | 11/2001 | Yuan |
| 2001/0044818 A1 | 11/2001 | Liang |
| 2001/0054020 A1 | 12/2001 | Barth et al. |
| 2002/0006788 A1 | 1/2002 | Knutsson et al. |
| 2002/0016736 A1 | 2/2002 | Cannon et al. |
| 2002/0021689 A1 | 2/2002 | Robbins |
| 2002/0095651 A1 * | 7/2002 | Kumar et al. ................. 717/104 |
| 2002/0133412 A1 | 9/2002 | Oliver et al. |
| 2002/0178070 A1 | 11/2002 | Leveridge |
| 2003/0067911 A1 | 4/2003 | Kikinis |
| 2003/0069991 A1 | 4/2003 | Brescia |
| 2003/0083889 A1 | 5/2003 | Macklin |
| 2003/0204756 A1 * | 10/2003 | Ransom et al. ............... 713/300 |
| 2004/0015572 A1 | 1/2004 | Kang |
| 2004/0030797 A1 | 2/2004 | Akinlar et al. |
| 2004/0039798 A1 | 2/2004 | Hotz et al. |
| 2004/0076144 A1 | 4/2004 | Ishidoshiro |
| 2004/0203752 A1 | 10/2004 | Wojaczynski et al. |
| 2005/0021943 A1 | 1/2005 | Ikudome |
| 2005/0102205 A1 | 5/2005 | Yamamoto |
| 2005/0143065 A1 | 6/2005 | Pathan et al. |
| 2005/0148342 A1 | 7/2005 | Sylvain |
| 2005/0240620 A1 * | 10/2005 | Danner et al. ................. 707/102 |
| 2005/0260973 A1 | 11/2005 | van de Groenendaal |
| 2006/0026170 A1 | 2/2006 | Kreitler et al. |
| 2006/0080446 A1 | 4/2006 | Bahl |
| 2006/0089122 A1 | 4/2006 | Zavalkovsky et al. |
| 2006/0135155 A1 | 6/2006 | Chung et al. |
| 2006/0174019 A1 | 8/2006 | Ikudome |
| 2007/0011268 A1 | 1/2007 | Banga et al. |
| 2007/0162598 A1 | 7/2007 | Gorodyansky |
| 2007/0201702 A1 | 8/2007 | Hendricks |
| 2007/0266125 A1 | 11/2007 | Lu |
| 2007/0271598 A1 | 11/2007 | Chen et al. |
| 2007/0294417 A1 | 12/2007 | Ikudome |
| 2008/0148383 A1 | 6/2008 | Pitchaikani et al. |
| 2008/0271109 A1 | 10/2008 | Singh et al. |
| 2009/0024745 A1 | 1/2009 | Short et al. |
| 2010/0115113 A1 | 5/2010 | Short et al. |
| 2010/0332615 A1 | 12/2010 | Short et al. |
| 2011/0030037 A1 | 2/2011 | Olshansky et al. |
| 2011/0131339 A1 | 6/2011 | Brown et al. |

FOREIGN PATENT DOCUMENTS

| | | |
|---|---|---|
| CA | 2 330 857 | 11/1999 |
| CA | 2330857 | 11/1999 |
| CA | 2 296 937 | 7/2000 |
| CA | 2296937 | 7/2000 |
| EP | 0573739 | 12/1993 |
| EP | 0742657 | 11/1996 |
| EP | 0767595 | 4/1997 |
| EP | 0873037 | 10/1998 |
| EP | 0901301 | 3/1999 |
| EP | 0912026 | 4/1999 |
| EP | 0946027 | 9/1999 |
| EP | 1 076 975 | 11/1999 |
| EP | 1 111 872 | 6/2001 |
| EP | 1 026 853 | 12/2007 |

| | | |
|---|---|---|
| GB | 2 283 645 | 5/1995 |
| GB | 2311439 | 9/1997 |
| GB | 2 326 306 | 12/1998 |
| JP | H06-209319 | 7/1994 |
| JP | 06-348625 | 12/1994 |
| JP | 7030575 | 1/1995 |
| JP | H07-202931 | 4/1995 |
| JP | 8-265372 | 10/1996 |
| JP | H08-265372 | 11/1996 |
| JP | 9046352 | 2/1997 |
| JP | 10-105516 A | 4/1998 |
| JP | 10-107839 | 4/1998 |
| JP | 11-055726 | 2/1999 |
| JP | 11055326 | 2/1999 |
| JP | 11-282804 A | 10/1999 |
| JP | 2002-514802 | 11/1999 |
| JP | 2000059416 | 2/2000 |
| JP | 2000-354127 | 12/2000 |
| JP | 2002-111870 | 4/2002 |
| WO | WO 96/05549 | 2/1996 |
| WO | WO 97/02687 | 1/1997 |
| WO | WO 97/09672 | 3/1997 |
| WO | WO 97/22936 | 6/1997 |
| WO | WO 97/27546 | 7/1997 |
| WO | WO 97/41586 | 11/1997 |
| WO | WO 97/48210 | 12/1997 |
| WO | WO 99/15995 | 4/1999 |
| WO | WO 99/28819 | 6/1999 |
| WO | WO 99/38303 | 7/1999 |
| WO | WO 99/39481 | 8/1999 |
| WO | WO 99/46890 | 9/1999 |
| WO | WO 99/57837 | 11/1999 |
| WO | WO 00/27092 | 5/2000 |
| WO | WO 00/58804 | 10/2000 |
| WO | WO 00/79406 A | 12/2000 |
| WO | WO 01/03011 | 1/2001 |
| WO | WO 01/03011 A2 | 1/2001 |
| WO | WO 01/63835 A | 8/2001 |
| WO | WO 2004/017658 | 2/2004 |
| WO | WO 2004/100499 | 11/2004 |

OTHER PUBLICATIONS

D. Liu, X.Y. Chen, X.P. Zhang, L. Liu; *Automatically Configure a System to Route Internet Traffic to a Proxy*; Apr. 1999; 1 page; IBM Technical Disclosure Bulletin; International Business Machines.

M. Chatel; *Classical versus Transparent IP Proxies (RFC1919)*; Mar. 1, 1996, Sep. 13, 2000; 29 pages; Internet Society Requests for Comment; Network Working Group.

Vineet Chikarmane, Rick Bunt, Carey Williamson; *Mobile IP-based Multicast as a Service for Mobile Hosts*; Proceedings of the 1995 Workshop on Physics and Computer Modeling; 1995; pp. 11-18; IEEE.

Qiang Gao, Anthony Acampora; *A Virtual Home Agent Based Route Optimization for Mobile IP*; 2000 IEEE Wireless Communications and Networking Conference; Sep. 2000; pp. 592-596; IEEE; Chicago, Illinois.

Stephen Heilbronner; *Requirements for Policy-Based Management of Nomadic Computing Infrastructures*; 1998; 14 pages.

Shoshana Loeb; *Interactive Billing for Broadband and Multimedia Services*; Community Networking 1995; Jun. 1995; pp. 221-223; IEEE.

Christopher Metz; *AAA Protocols: Authentication, Authorization, and Accounting for the Internet*; IEEE Internet Computing; 11, Dec. 1999; pp. 75-79; IEEE.

Charles E. Perkins, Pravin Bhagwat; *A Mobile Networking System based on Internet Protocol*; IEEE Personal Communications; 1994; pp. 32-41; IEEE.

David L. Tennenhouse, Jonathan M. Smith, W. David Sincoskie, David J. Wetherall, Gary J. Minden; *A Survey of Active Network Research*; IEEE Communications Magazine; Jan. 1997; pp. 80-86; IEEE.

Chu-Sing Yang, Jiing-Ching Yang, Kun-Da Wu, Jian-Xing Lee, Yuh-Rong Leu; *An Efficient Multicast Delivery Scheme to Support Mobile IP*; Proceedings of the 10$^{th}$ International Workshop on Database and Expert Systems Applications; 1999; 6 pages; IEEE Computer Society, Washington DC.

B. Aboba, J. Lu, J. Alsop, J. Ding, W. Wang; *Review of Roaming Implementations*; Sep. 1997; 35 Pages; Network Working Group, Request for Comments 2194.

Pravin Bhagwat, Charles Perkins, Satish Tripathi; *Network Layer Mobility: An Architecture and Survey*; IEEE Personal Communications; Jun. 1996; pp. 54-64; IEEE.

Plaintiff Nomadix, Inc.'s Reply Claim Construction Brief; *Nomadix, Inc. vs. Second Rule LLC*; Civil Action CV07-1946 USDC, CDCA WD; Aug. 22, 2008; 277 pages.

Declaration of Don P. Foster Re. Second Rule LLC's Opening claim Construction Brief; *Nomadix, Inc. vs. Second Rule LLC*; Civil Action CV07-1946 USDC, CDCA WD; Aug. 4, 2008; Part 1, 227 pages; Part 2, 230 pages.

Defendants's Opening Claim Construction Brief; *Nomadix, Inc. vs. Second Rule LLC*; Civil Action CV07-1946 USDC, CDCA WD; Aug. 4, 2008; 54 pages.

Plaintiff's Opening Claim Construction Brief [Redacted Public Version]; *Nomadix, Inc. vs. Second Rule LLC*; Civil Action CV07-1946 USDC, CDCA WD; Aug. 4, 2008; 237 pages.

Defendant's Reply to Plaintiff's Opening Claim Construction Brief; *Nomadix, Inc. vs. Second Rule LLC*; Civil Action CV07-1946 USDC, CDCA WD; Aug. 22, 2008; 44 pages.

Maruyama et al, "*A secure LAN sockets system for everyone which need not modify existing DHCP clients*", Study Report of Information Processing Society of Japan, Jul. 16, 1999, vol. 99, No. 56, pp. 131-136.

US 5,862,325, 01/1999, Reed et al. (withdrawn).

Apostolopoulos, G., et al.: "IBM Research Report L5: A Self Learning Layer-5 Switch", Computer Science/Mathematics, RC 21461(96867)Apr. 29, 1999, pp. 1-19.

Arar, Y., Prepaid Internet Access Cards: Instant ISP, http://www.pcworld.com/article/5045/prepaid_internet_access_cards_instant_isp.html, PC World, Jul. 14, 1997, 2 pages.

Auric Web Systems, InterACS: Internet Access Control System: Solutions for the Internet Service Provider, http://web.archive.org/web/19970708234615/http:/www.auricweb.com/InterACS.html, Jul. 8, 1997, 5 pages.

Auric Web Systems, The Intercard System Prepaid Internet Access Cards, http://web.archive.org/web/19970708234054/http:/www.auricweb.com/Accesscard.html, Auric Web Systems, Jul. 8, 1997, 4 pages.

"Auric Web Systems Unveils Software to Reduce the Operating Costs of Internet Service Providers", http://www.allbusiness.com/technology/software-services-applications-internet/6971623-1.html, AllBusiness, Mar. 25, 1997, 2 pages.

Auric Web Systems, WebGate Card: FAQ, http://web.archive.org/web/19980520083043/http:/www.auricweb.com/faq.html, May 20, 1998, 5 pages.

Berkowitz, Howard C.: PIER Working Group, Router Renumbering Guide, Aug. 1996, http://tools.ietf.org/pdf/draft-ietf-pier-rr-02.pdf.

Bestavros, A. and Michael J. Ocean, Chapter 12: "Virtualization and Programming Support for Video Sensor Networks with Application to Wireless and Physical Security," Distributed Video Sensor Networks, 2011, pp. 179-192.

Case No. 07-1946 GPS (VBK) *Nomadix, Inc. v. Second Rule LLC*, Plaintiff's Reply to Defendant's First Amended Answer and Counterclaims and Demand for Jury Trial, Jul. 31, 2007.

Case No. 07-1946 GPS (VBK) *Nomadix, Inc. v. Second Rule LLC*, Defendant's First Supplemental Response to Plaintiff's Claim Chart dated Apr. 18, 2008.

Case No. 07-1946 DDP (VBKx) *Nomadix, Inc. v. Second Rule LLC*, Declaration of Don P. Foster re: Second Rule LLC's Opening Claim Construction Brief, dated Aug. 4, 2008.

Case No. 07-1946 DDP (VBKx) *Nomadix, Inc. v. Second Rule LLC*, Declaration of Mark Lezama in Support of Nomadix, Inc.'s Opening Claim Construction Brief, dated Aug. 4, 2008.

Case No. 07-1946 DDP (VBKx) *Nomadix, Inc. v. Second Rule LLC*, Defendant's Opening Claim Construction Brief, dated Aug. 4, 2008.

Case No. 07-1946 DDP (VBKx) *Nomadix, Inc. v. Second Rule LLC*, Plaintiff's Opening Claim Construction Brief, Redacted Public Version, dated Aug. 4, 2008.

Case No. 07-1946 DDP (VBKx) *Nomadix, Inc. v. Second Rule LLC*, Amended Claim Construction Order (Motion filed on Aug. 4, 2008).

Case No. 07-1946 DDP (VBKx) *Nomadix, Inc. v. Second Rule LLC*, Declaration of Don P. Foster Re: Second Rule LLC's Reply to Plaintiff's Opening Claim Construction Brief, dated Aug. 22, 2008.
Case No. 07-1946 DDP (VBKx) *Nomadix, Inc. v. Second Rule LLC*, Declaration of Douglas G. Muehlhauser in Support of Nomadix Inc.'s Claim Construction Briefs, dated Aug. 22, 2008.
Case No. 07-1946 DDP (VBKx) *Nomadix, Inc. v. Second Rule LLC*, Declaration of Mark Lezama in Support of Nomadix, Inc.'s Reply Claim Construction Brief, dated Aug. 22, 2008.
Case No. 07-1946 DDP (VBKx) *Nomadix, Inc. v. Second Rule LLC*, Defendant's Reply to Plaintiff's Opening Claim Construction Brief, dated Aug. 22, 2008.
Case No. 07-1946 DDP (VBKx) *Nomadix, Inc. v. Second Rule LLC*, Reply Claim Construction Brief, dated Aug. 22, 2008.
Case No. 07-1946 DDP (VBKx) *Nomadix, Inc. v. Second Rule LLC*, Notice of Motion and Motion of Second Rule LLC for Partial Summary Judgment; Sep. 5, 2008.
Case No. 07-1946 DDP (VBKx) *Nomadix, Inc. v. Second Rule LLC*, Declaration of Don P. Foster Re: Motion of Second Rule, LLC for Partial Summary Judgment dated Sep. 5, 2008.
Case No. 07-1946 DDP (VBKx) *Nomadix, Inc. v. Second Rule LLC*, Defendant's Statement of Uncontroverted Facts and Conclusions of Law in Support of Defendant's Partial Summary Judgement dated Sep. 5, 2008.
Case No. 07-1946 DDP (VBKx) *Nomadix, Inc. v. Second Rule LLC*, Memorandum of Law in Support of Motion of Second Rule, LLC for Partial Summary Judgment dated Sep. 5, 2008.
Case No. 07-1946 DDP (VBKx) *Nomadix, Inc. v. Second Rule LLC*, Order Requesting Supplemental Briefing re: Second Rule LLC's Motion for Partial Summary Judgment, dated Oct. 21, 2008.
Case No. 07-1946 DDP (VBKx) *Nomadix, Inc. v. Second Rule LLC*, Defendant's Supplemental Post-Hearing Claim Construction Brief, dated Sep. 26, 2008.
Case No. 07-1946 DDP (VBKx) *Nomadix, Inc. v. Second Rule LLC*, Nomadix, Inc.'s Supplemental Claim Construction Brief, dated Sep. 26, 2008.
Case No. 07-1946 DDP (VBKx) *Nomadix, Inc. v. Second Rule LLC*, Claim Construction Order dated Oct. 3, 2008.
Case No. 07-1946 GPS (VBK) *Nomadix, Inc. v. Second Rule LLC*, Expert Report of Peter Alexander, Ph.D.; Oct. 31, 2008.
Case No. CV 09-8441 (C.D. Cal. 2009), *Nomadix, Inc. v. Hewlett-Packard Co.*, Complaint filed Nov. 17, 2009.
Case No. CV 10-0381 (C.D. Cal. 2010), *Nomadix, Inc. v. SolutionInc Technologies Ltd.*, Complaint filed Jan. 19, 2010.
Case No. 2:08-cv-00264-DF-CE, *Linksmart Wireless Technology, LLC*, v. *T-Mobile USA, Inc., et al.*, Defendants' Patent Local Rule 4-2 Preliminary Constructions and Extrinsic Evidence, filed Jan. 21, 2010.
Case No. 2:08-cv-00264-DF-CE, *Linksmart Wireless Technology, LLC*, v. *T-Mobile USA, Inc., et al.*, Best Western's Supplemental Claim Construction Brief, filed Apr. 16, 2010.
Case No. 2:08-cv-00264-DF-CE, *Linksmart Wireless Technology, LLC*, v. *T-Mobile USA, Inc., et al.*, Claim Construction Brief of Defendants, filed Apr. 16, 2010.
Case No. 2:08-cv-00264-DF-CE, *Linksmart Wireless Technology, LLC*, v. *T-Mobile USA, Inc., et al.*, Declaration of Kevin Jeffay, Ph.D., filed Apr. 16, 2010.
Case No. 2:08-cv-00264-DF-CE, *Linksmart Wireless Technology, LLC*, v. *T-Mobile USA, Inc., et al.*, Declaration of Noah A. Levine in Support of Claim Construction Brief of Defendants filed Apr. 16, 2010.
Case No. 2:08-cv-00264-DF-CE, *Linksmart Wireless Technology, LLC*, v. *T-Mobile USA, Inc., et al.*, Defendant Barnes & Noble Booksellers, Inc.'s First Amended Answer to Plaintiffs Complaint, filed Apr. 22, 2010.
Case No. 2:08-cv-00264-DF-CE, *Linksmart Wireless Technology, LLC*, v. *T-Mobile USA, Inc., et al.*, Defendant Mail Boxes Etc., Inc.'s First Amended Answer to Plaintiffs Complaint, filed Apr. 22, 2010.
Case No. 2:08-cv-00264-DF-CE, *Linksmart Wireless Technology, LLC*, v. *T-Mobile USA, Inc', et al.*, Defendants' SBC (AT&T), Wayport, McDonalds, Barnes & Noble and Mail Boxes etc. Joint Unopposed Motion for Leave to Amend Their Respective First Answers and Counterclaims, filed Apr. 22, 2010.

Case No. 2:08-cv-00264-DF-CE, *Linksmart Wireless Technology, LLC*, v. *T-Mobile USA, Inc., et al.*, Defendant SBC Internet Services, Inc. D/B/A AT&T Internet Services's ("AT&T") First Amended Answer to Plaintiffs Complaint, Linksmart Wireless Technology, filed Apr. 22, 2010.
Case No. 2:08-cv-00264-DF-CE, *Linksmart Wireless Technology, LLC*, v. *T-Mobile USA, Inc., et al.*, McDonald's Corp.'s First Amended Answer, Defenses, and Counterclaims to Complaint, filed Apr. 22, 2010.
Case No. 2:08-cv-00264-DF-CE, *Linksmart Wireless Technology, LLC*, v. *T-Mobile USA, Inc., et al.*, Wayport, Inc.'s First Amended Answer, Defenses, and Counterclaims to Complaint, filed Apr. 22, 2010.
Defendants' Joint Invalidity Contentions, *Nomadix, Inc. v. Hewlett-Packard Company et al.*, No. CV09-08441 DDP (VBKx), Jul. 1, 2010.
First Claim Construction Order, *Nomadix, Inc. v. Hewlett-Packard Company et al.*, No. CV-09-08441 DDP (VBKx), filed Aug. 31, 2011 in 17 pages.
Second Claim Construction Order, *Nomadix, Inc. v. Hewlett-Packard Company, et al.*, No. CV-09-08441 DDP (VBKx), filed Oct. 24, 2011 in 19 pages.
Case No. 09-CV-8441 DDP (VBKx), *Nomadix, Inc. v. Hewlett-Packard Co. et al.*, Defendants' Supplemental Invalidity Contentions Regarding the Prior Art Work of Mr. Ko Ikudome, dated Nov. 4, 2011, 21 pages including Exhibits I1-I3.
Case No. 09-CV-8441 DDP (VBKx), *Nomadix, Inc. v. Hewlett-Packard Co. et al.*, Defendants' Supplemental Invalidity Contentions Regarding the SPINACH Prior Art and the Vos Publication, dated Nov. 21, 2011, 64 pages including Exhibits I4, S1-S3, and V1-V3.
Case No. 09-CV-8841 DDP (VBKx), Defendants' Supplemental Invalidity Contentions Regarding John Birrell, Jr., 37 pages.
Data Communication Over the Telephone Network Procedures for Starting Sessions of Data Transmission Over the General Switched Telephone Network, ITU-T Recommendation V.8, approved on Sep. 20, 1994.
Eventou, A., Anywhere Online Access, Auric Web Systems find many applications for its WEBGate card that's a prepaid key to Internet, Dec. 22, 1997, 1 page.
Heilbronner, S.: "Requirements for Policy-Based Management of Nomadic Computing Infrastructures," Proc. of the Sixth Workshop of the HP Openview University Association (HPOVUA '99), Bologna, Italy, Jun. 1999.
Hluchyj, M. G. et al., Queueing Disciplines for Integrated Fast Packet Networks, IEEE 1992, 7 pages.
How to Determine the Version of Windows 95/98/Me in Use, http://support.microsoft.com/kb/158238, Jan. 21, 2010.
Internet is the Key, as the Integration of Locations and their Information Begins, Nikkei Electronics, Jul. 13, 1998.
Internet Technologies Handbook, Chapter 15, Dial-up Technology, Cisco Systems, Indianapolis: Cisco Press, 1998.
Johnson, D. B., "Ubiquitous Mobile Host Internetworking", 0-8186-4000-6/93 1993 IEEE, pp. 85-90.
Kalkbrenner, et al., Quality of Service (QoS) in Distributed Hypermedia-Systems, Jul. 1995, IEEE, v 10-8186-7180, pp. 529-534.
Kausar, et al., A Charging Model for Sessions on the Internet, European conference on Multimedia Applications, Services and Techniques, Department of Computer Science, University College London, 1999. pp. 246-261.
Korba, Larry, "Security System for Wireless Local Area Networks," Ninth IEEE International Symposium on Personal, Indoor and Mobile Radio Communications, Sep. 8, 1998, pp. 1550-1554.
Lee, Chooi-Tian and J.W. Harris, "Designing a Virtual Access Control Configuration Protocol for Implementation over ISDN and Shared-Media Networks," Proceedings 21st IEEE Conference on Local Computer Networks, Oct. 13, 1996, pp. 116-125.
Levene, Mark and Loizou, George, A Guided Tour of Relational Databases and Beyond, Springer-Verlag London Limited, Great Britain, 1999.
Livingston Enterprises, Inc., ChoiceNet Administrator's Guide, Jan. 1997, Pleasanton, CA, available at http://portmasters.com/tech/docs/pdf/choice.pdf.

McKinley, R., Prepaid Internet Access Cards, http://www.cardtrak.com/news/1997/07/14/prepaid_internet_access_cards, CardTrak.com, Jul. 14, 1997, 1 page.

Michard, A. et al.; The Aquarelle resource discovery system; Computer Networks and ISDN Systems; 1998; pp. 1185-1200; vol. 30, NR. 13; North Holland Publishing; Amsterdam, NL; XP004147404; ISSN: 0169-7552.

Microsoft TechNet: Dial-Up Networking and Mobile Computing: The Basics, http://technet.microsoft.com/en-us/library/cc751107, 2010.

Microsoft WindowsNT ResourceKit, Version 4.0, Supplement One, Microsoft Press, 1997.

Microsoft WindowsNT Workstation ResourceKit: Comprehensive Resource Guide and Utilities for Windows NT Workstation Version 4.0, Microsoft Press, 1996.

Microsoft Computer Dictionary, Fourth Edition, Microsoft Press, 1999.

Network Working Group Request for Comments: 1009—Requirements for Internet Gateways (Jun. 1987).

Network Working Group Request for Comments: 1027—Using ARP to Implement Transparent Subnet Gateways (Oct. 1987).

Network Working Group Request for Comments: 1034—Domain Names—Concepts and Facilities (Nov. 1987).

Network Working Group Request for Comments: 1531—Dynamic Host Confirmation Protocol (Oct. 1993).

Network Working Group Request for Comments: 1919—Classical Versus Transparent IP Proxies (Mar. 1996).

Network Working Group Request for Comments: 1945—Hypertext Transfer Protocol—HTTP/1.0 (May 1996).

Network Working Group Request for Comments: 826—Ethernet Address Resolution Protocol (Nov. 1982).

Network Working Group Request for Comments: 894—Standards for Transmission of IP Datagrams Over Ethernet Networks (Apr. 1984).

Network Working Group Request for Comments: 925—Multi-LAN Address Resolution (Oct. 1984).

Networking Working Group, Radius Accounting, Request for Comments: 2139, Obsoletes: 2059; Category: Informational, C. Rigney, Livingston, Apr. 1997; IP 3 002991-003013.

Newton, Harry, Newton's Telecom Dictionary, p. 206, Telecom Books and Flatiron Publishing, Miller Freeman, Inc., New York, NY, 1998.

Perkins, C. E. ED—Insitute of Electrical and Electronics Engineers: "Mobile-IP, AD-HOC Networking, and Nomadicity" Proceedings of the 20th Annual International Computer Software and Applications Conference (COMPSAC). Seoul, Aug. 21-23, 1996, Proceedings of the Annual International Computer Software and Applications Conference (COMPSAC), Los Alamitos, IEEE COMP, vol. CONF. 20, pp. 472-476, XO 000684381, ISBN 0-8186-7579-9.

Person, et al., Using Windows 95, Platinum Edition, pp. 205-209,812-813, Que Corporation, 1996.

Rao, A Proxy-Based Personal Portal, Proceedings of the WebNet99 Conference, Hawaii, Oct. 1999, p. 913.

Rao, iProxy: A Programmable Proxy Server, Poster Proceedings of the WebNet99 Conference, Oct. 1999, p. 1676.

Richards, et al., Mapping User Level QOS from a Single Parameter, 1988, pp. 1-15.

Salifu, Abdul-Mumin, "Detection of Man-in-the-Middle Attack in IEEE 802.11 Networks," M.S. Thesis, Kwame Nkrumah University of Science and Technology, May 2011, 79 pages.

Simpson and Weiner, The Oxford English Dictionary, 2nd Edition, vol. III, pp. 514-515, Oxford University Press, 1989.

Simpson and Weiner, The Oxford English Dictionary, 2nd Edition, vol. VII, p. 881, Oxford University Press, 1989.

Single-User Network Access Security TACACS+ http://www.cisco.com/warp/public/614/7.html IP3 002876-002884; dated Aug. 10, 2005.

Stoll, Frank, "The Need for Decentralization and Privacy in Mobile Communications Networks," Computers & Security vol. 14 iss. 6, 1995, pp. 527-539.

Tantawy, Ahmed N. and Martina Zitterbart, "A Scheme for High-Performance LAN Interconnection Across Public MAN's," IEEE Journal on Selected Areas in Communications, vol. 11, No. 8, Oct. 1993, pp. 1133-1144.

The 'Security Digest' Archives, TCP-IP Distribution List, Aug. 1994, http://securitydigest.org/tcp-ip/archive/1994/08.

Vos, Jos and Willy Konijnenberg, Linux Firewall Facilities for Kernel-level Packet Screening, Nov. 18, 1996, 19 pages.

Windows History: Windows Desktop Timeline, Jun. 30, 2003, available at http://www.microsoft.com/windows/WinHistoryProGraphic.mspx on Jan. 21, 2010, Microsoft, pp. 1-2.

Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011.

Appenzeller, et al., "User-Friendly Access Control for Public Network Ports," Department of Computer Science, Stanford University, dated Aug. 31, 1998 in 16 pages.

Anderson, et al., The Magicrouter, an Application of Fast Packet Interposing, dated May 17, 1996 in 12 pages.

Exhibit A, Asserted Claims, filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011, in 2 pages.

Exhibit B, Supplemental Prior Art List filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 2 pages.

Exhibit C1, Claim Comparison for U.S. Patent No. 6,130,892 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 4 pages.

Exhibit C2, Claim Comparison for U.S. Patent No. 7,088,727 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 7 pages.

Exhibit C3, Claim Comparison for U.S. Patent No. 7,554,995 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 25 pages.

Exhibit C4, Claim Comparison for U.S. Patent No. 6,636,894, filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011, in 18 pages.

Exhibit C5, Claim Comparison for U.S. Patent No. 7,194,554 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 18 pages.

Exhibit C6, Claim Comparison for U.S. Patent No. 6,868,399 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-CV-00381 DDP (VBKx), (Central District of California, Western Division, and dated Jul. 22, 2011 in 22 pages.

Exhibit C7, U.S. Patent No. 7,689,716 filed in Defendants' Supplemental Joint Invalidity Contentions, *NOMADIX, Inc.* v. *Hewlett-Packard Company, et al.*, Case No. 09-CV-8441 DDP (VBKx) and *NOMADIX, Inc.* v. *Solutionic Technologies Limited*, Case No. 2:10-

CV-00381 DDP (VBKx), (Central District of California, Western Division, and dated Jul. 22, 2011 in 11 pages.
ATCOM/INFO to Display High-Speed Plug-And-Play Internet Access Software with Microsoft at HITEC, Jul. 22, 1999.
ATCOM/INFO's IPORT Brings High Speed Internet Access to Hotels in Japan and Mexico; ATCOM and Tut Systems Partner to Expand International Presence of 'Plug and Play' Internet Access, May 11, 1999.
Atkins, Internet Security Professional Reference; IP Spoofing and Sniffing, Ch. 6, 1996.
Barnes, Defense Data Network Usage Accounting Enhancement Approaches, Apr. 1989.
Borella et al., IETF Internet-Draft—Distributed Network Address Translation, Internet Engineering Task Force, Oct. 1998.
Caronni et al., Efficient Security for Large and Dynamic Multicast Groups, Jun. 1998.
Comer, Internetworking With TCP/IP, vol. 1, Chapter 10, Principles, Protocols, and Architecture, 3rd ed., Prentice Hall, 1995.
Dahm, Redirecting your visitors, May 1999.
Deering et al., Network Working Group RFC 966—Host Groups: A Multicast Extension to the Internet Protocol, Dec. 1985.
Edell, Billing Users and Pricing for TCP (IEEE Journal on Selected Areas in Communications vol. 13 (Sep. 1995) No. 7), Apr. 15, 1995.
Elastic Networks Unveils YesWare; Mobility Software Solution Target Visitor-Based Networking; PRNewswire, Apr. 12, 1999.
Furnell et al., A Security Framework for Online Distance Learning and Training, 1998.
Giovanardi, Transparent Mobile IP: an Approach and Implementation, Global Telecommunications Conference, Nov. 3, 1997.
Heberlein, Attack Class: Address Spoofing, Proceedings of the Nineteenth National Information Systems Security Conference, Oct. 1996.
Hotelier, ATCOM/INFO Makes High-Speed Internet Access to Corporate Networks Secure for Business Travelers, Jul. 17, 1999.
Kaashoek et al., Efficient Reliable Group Communication for Distributed Systems, Jul. 1992.
Kent et al., RFC 2401—Security Architecture for the Internet Protocol, Network Working Group, Nov. 1998.
Kostick, IP Masquerading with Linux; Linux Journal Issue 27. See http://portal.acm.org/citation.cfm?id=328288.328289, Jul. 1996.
Kruus, Peter S., A Survey of Multicast Security Issues and Architectures, 1998.
Kuri, Jurgen, Gruppenreise Ins Internet Gemeinsamer Internet—Zugang durch das LAN, 1998.
Lear, RFC 1627, Network 10 Considered Harmful, Jul. 1994.
Leveridge, Campus World and BT's On-Line Education Services, BT Technology Journal, Apr. 1997.
Lo et al., IETF Internet-Draft—Realm Specific IP: A Framework, Internet Engineering Task Force, Feb. 1999.
Making the Most of Home Pages, E-mail, The Internet and Presentation Graphics, The Journal, Aug. 1, 1998.
Manuel Gunter, Virtual Private Networks over the Internet, Aug. 3, 1998.
Messmer, "Gateway Handles Thorny Problems with Addressing IP Networks", Network World, p. No. 8, Nov. 28, 1994.
Messmer, New room-service fare: High-speed Internet access, Dec. 7, 1998.
Mogul et el., RFC 950—Internet Standard Subnetting Procedure, Network Working Group, Aug. 1985.
Perkins, RFC 2002: IP Mobility Support, Oct. 1996.
PIX, Network Translation Inc., Private Internet Exchange (PIX) Technical White Paper (Network Address Translation and the Private Internet Exchange, 1994.
PIX, Network Translation Inc., Private Internet Exchange (PIX) Technical White Paper, May 16, 1995.
PIX, Network Translation Inc., Private Internet Exchange Reference Manual, Oct. 5, 1995.
R. Droms, RFC 2131—Dynamic Host Configuration Protocol, Network Working Group, Mar. 1997.
Rao, A Proxy-Based Personal Portal, Proceedings of the WebNet99 Conference, Hawaii, Oct. 1999.
Rao, iProxy: A Programmable Proxy Server, Poster Proceedings of the WebNet99 Conference, Oct. 1999.
Rekhter, RFC 1597, Address Allocation for Private Internets, Mar. 1994.
Rekhter, RFC 1918, Address Allocation for Private Internets, Feb. 1996.
Rigney, RFC 2058, Remote Authentication Dial in User Service (RADIUS), Jan. 1997.
Rigney, RFC 2059, Radius Accounting, Jan. 1997.
Rupp, INDEX: A Platform for Determining how People Value the Quality of their Internet Access, INDEX Project Report #98-010P, May 1998.
Sandhu et al., Decentralized Group Hierarchies in UNIX: An Experiment and Lessons Learned, Oct. 1998.
Scale, How to Cost-Effectively Scale Web Servers, Packet Magazine, Third Quarter, 1996.
Schooler, A Distributed Architecture for Multimedia Conference Control, Nov. 1991.
Srisuresh et al., RFC 2663—IP Network Address Translator (NAT) Terminology and Considerations, Network Working Group, Aug. 1999.
Team Internet Technical Specifications, Infomine Network Solutions and Services, Helena, Montana, Sep. 7, 1998.
Troy, Timothy N., "Servicing with Software," Hotel & Motel Management, Sep. 20, 1993, p. 28, vol. 208, No. 16, Advanstar Communications, Inc.
Tsuchiya et al., Extending the IP Internet Through Address Reuse, ACM SIGCOMM Computer Communication Review, 1993.
Valencia, RFC 2341, Cisco Layer Two Forwarding (Protocol) "L2F", May 1998.
Victor Bojorquez, CheckPoint Software Tech. LTD., How to Configure Firewall-1 With Connect Control, Oct. 10, 1999.
Wahl, RFC 2256, A Summary of the X.500(96) User Schema for use with LDAPv3, Dec. 1997.
Webb, Automatic Redirection, Jun. 8, 1997.
Defendants' Supplemental Joint Invalidity Contentions, *Nomadix, Inc.* v. *Hewlett-Packard Company et al.*, No. CV09-08441 DDP (VBKx), Jul. 15, 2010.
Nomadix, Inc.'s Disclosure of Asserted Claims and Infringement Contentions, *Nomadix, Inc.* v. *Hewlett-Packard Company et al.*, No. CV09-08441 DDP (VBKx), May 24, 2010.
Plaintiff's Preliminary Invalidity Contentions and Accompanying Document Production Regarding U.S. Patent Nos. 6,996,073 and 7,580,316, *Nomadix, Inc.* v. *Hewlett-Packard Company et al.*, No. CV09-08441 DDP (VBKx), Jul. 15, 2010.
Plaintiff's Preliminary Invalidity Contentions and Accompanying Document Production, *Nomadix, Inc.* v. *Hewlett-Packard Company et al.*, No. CV09-08441 DDP (VBKx), Jul. 1, 2010.
U.S. Appl. No. 09/295,966, filed Apr. 21, 1999.
U.S. Appl. No. 10/919,214, filed Aug. 16, 2004—file history of U.S. Publication No. 2005-0021943, published Jan. 27, 2005.
U.S. Appl. No. 11/375,740, filed Mar. 14, 2006—file history of U.S. Publication No. 2006-0174019, published Aug. 3, 2006.
U.S. Appl. No. 11/645,924, filed Dec. 26, 2006—file history of U.S. Publication No. 2007-/0294417, published Dec. 20, 2007.
U.S. Appl. No. 60/072,175 by Brothers, filed Jan. 22, 1998.
Aceves, Wireless Internet Gateways (Wings), Proc. IEEE MILCOM '97, Monterey, California, Nov. 1997.
Agrawal, Swan: A Mobile Multimedia Wireless Network, IEEE Personal Communications, Apr. 1996.
Alexander, Active Bridging, University of Pennsylvania Technical Report No. MS-CIS-97-02, Jan. 1997.
Alonso, Database system issues in nomadic computing; Proceedings of the 1993 ACM SIGMOD International Conference on Management of Data, May 26, 1993.
Altmann, (Workshop '99) Assisting Users in Complex Purchasing Decisions, Jan. 12, 1999.
Altmann, INDEX Project: User support for buying QoS with regard to user's preferences, Sixth International Workshop on Quality of Service, May 18, 1998.
Amadio, Modelling IP Mobility, Nov. 1997.
Aoyama, The Cost of Adaptivity and Virtual Lanes in a Wormhole Router, 1995.
Babbage, Internet phone—changing the telephony paradigm?, BT Technology Journal, vol. 15, Iss. 2, Apr. 1997.

Badrinath, To Send or not to Send: Implementing Deferred Transmissions in a Mobile Host, Proceedings of 16th International Conference on Distributed Computing Systems, May 27, 1996.
Bagrodia, Vision, Issues, and Architecture for Nomadic Computing, IEEE Personal Communications, Dec. 1995.
Baker, Local Control Over Filtered WWW Access, Fourth International World Wide Web Conference, Dec. 13, 1995.
Baker, RFC 1812; Requirements for IP Version 4 Routers, Jun. 1995.
Baker, Supporting Mobility in MosquitoNet, Proceedings of the 1996 USENIX Technical Conference, San Diego, CA., Jan. 22, 1996.
Beigl, System Support for Mobile Computing, Computers & Graphics, vol. 20, Iss. 5, Sep. 1996.
Bieszczad, Towards plug-and-play networks with mobile code, Proceedings of the International Conference for Computer Communications ICCC'97, Mar. 1997.
Bjorn, The Case for Quality of Service On Demand Empirical Evidence from the INDEX Project, ISQE'99, Workshop on Internet Service Quality Economics, Cambridge, MA, USA, Dec. 1999.
Blackwell, Secure Short-Cut Routing for Mobile IP, Proceedings of the USENIX Summer 1994 Technical Conference on USENIX Summer 1994 Technical Conference, Jun. 10, 1994.
Boutell, CGI Programming in C & Perl, 1996.
Braden, RFC 1122 Requirements for Internet Hosts—Communication Layers, Oct. 1989.
Brattli, The Software Network, Providing Continuous Network Connectivity for Multihoming Mobile Computers, Dec. 16, 1996.
Broman, Implementation and Analyses of the Mobile-IP Protocol, Jan. 25, 1996.
Brown, A Strategic Plan for Ubiquitous Laptop computing, vol. 41, No. 1, Communications of the ACM, Jan. 1998.
Brown, M-TCP: TCP for Mobile Cellular Networks, Jul. 29, 1997.
Bush, Mobile ATM Orderwire and Network Configuration, 1996.
Caceres, Fast & Scalable Handoffs for Wireless Internetworks, Proceedings of the 2nd annual international conference on Mobile computing and networking, Nov. 1996.
Casey, Realizing Mobile Computing Personae, Ph.D. Thesis, Oct. 1995.
Chapman, Building Internet Firewalls, IP3 002885-002944, Sep. 1995.
Chapman, Network (In)Security Through IP Packet Filtering, Proceedings of the Third USENIX UNIX Security Symposium, Sep. 1992.
Check Point Ad, Sep. 14, 1998.
Check Point FireWall-I White Paper, v.3, Jun. 1997.
Check Point Software Delivers Breakthrough Security Advancements with Firewall-1 3.0, Oct. 7, 1996.
Check Point SoftwareCheck Point Firewall-I 4.0 Gains Int'l Recognized ITSEC Security Cert., Nov. 9, 1998.
Cheshire, Internet Mobility 4x4, Mobility: Processes, Computers, and Agents, SIGCOMM '96, Aug. 30, 1996.
Cheswick, The Design of a Secure Internet Gateway, Apr. 20, 1990.
Chikarmane, Multicast Support for Mobile Hosts Using Mobile IP, May 16, 1997.
Chikarmane, Network Support for Mobile Hosts in a TCP/IP internetwork, Aug. 1995.
Cho, An Efficient Location and Routing Scheme for Mobile Computing Environments, IEEE Journal on Selected Areas in Communications, 1995.
Cisco Systems, Inc., LocalDirector Quick Start Guide and User Reference Manual, Version 1.0, Jul. 1996.
Cisco's High-Performance Stateful Firewall Delivers Unparalleled Security, PIX Firewall Data Sheet, 1996.
Cisco; Single-User Network Access Security TACACS+; 9 pages; Cisco White Paper; XP002124521, Mar. 30, 1995.
Cobb, Universal Mobile Addressing, IEEE Workshop on Mobile Computing Systems and Applications, 1994.
Collier, Netlets: The Future of Networking, Apr. 4, 1998.
Comer, An Architecture for a Campus-Scale Wireless Mobile Internet, Purdue University Department of Computer Science Technical Report No. CSD-TR 95-058, Sep. 1995.
Connection Methods and Concepts for IPORT v2.x, Nov. 1998.
Copper Mountain Introduces CopperPowered Hotel Initiative to Deliver Cost-effective Always-on or Usage-based Broadband Access to Hotel Guests (Business Wire), Dec. 6, 1999.
Damani, ONE-IP: techniques for Hosting a Service on a Cluster of Machines, Jun. 29, 2004.
Desrosiers, Transparent Access of Remote Resources, IBM Technical Disclosure Bulletin, vol. 27, No. 7B, p. 4230, Dec. 1984.
Devivo, Internet Security Attacks at the Basic Levels, ACP SIGOPS Operating Systems Review, vol. 32, Iss. 2, Apr. 1998.
Droms, RFC 1541, Dynamic Host Configuration Protocol, Oct. 1993.
Droms, RFC 2131, Dynamic Host Configuration Protocol, Mar. 1997.
Duda, Mobile Agent Architecture for Nomadic Computing, International Conference on Computer Communications, Cannes, 1997.
Edell, Demand for Internet Access: What we learn from the INDEX trial, Mar. 13, 1999.
Edell, Internet Demand Experiment: Technology and Market Trial, Ph.D. Thesis, Spring, 2001.
Elton, Linux as a Proxy Server, Linux Journal archive, vol. 1997, Issue 44, Article 3, ISSN: 1075-3583 See http://portal.acm.org/citation cfm?id=327077 .327080, Dec. 1997.
Estrin, Inter-organization networks: implications of access control: requirements for interconnection protocol, ACM SIGCOMM Computer Communication Review, vol. 16, Iss. 3, Aug. 1986.
Felten, Web Spoofing: An Internet Con Game, Princeton University Technical Report No. 540-96, Feb. 1997.
Fielding, RFC 2068 Hypertext Transfer Protocol HTTP 1.1, Jan. 1997.
Ford, Securing a Mobile Internet, Oct. 7, 1999.
Google Groups: "home network" laptop; IP3 002769-70; Newsgroups: comp.sys.sun.admin. Newsgroups: comp.sys.sun.admin., Aug. 3, 2004.
Google Groups: netswitcher; IP3 002516; Newsgroups: comp.os.ms windows, Aug. 2, 2004.
Google Groups: network configuration laptop packets; IP3 002765-66; Newsgroups: comp.protocols.tcp-ip, Aug. 2, 2004.
Google Groups: network laptop settings; IP3 002767-68; Laptop on Dual Networks; Newsgroups: comp.os.ms windows, Jul. 30, 2004.
Google Groups: network settings DHCP mobile; IP3 002511-15; Newsgroups: comp.sys.mac.comm, Aug. 3, 2004.
Google Groups: redirect "login page"; IP 3 002873-74; Newsgroup: microsoft.public,inetserver.iis.activeserverpages . cited by other, Jul. 28, 2004.
Google Groups: View Thread; IP3 002505-06; Newsgroups:microsoft,public.win95.networking, Aug. 2, 2004.
Google Groups: View Thread; IP3 002507-10; Newsgroups: comp.os.os2.networking.tcp-ip, Aug. 2, 2004.
Grant, TACACS+ Protocol Version 1.75 Internet Draft (TACACS+)/RFC1492, Oct. 1996.
Gray, Mobile Agents for Mobile Computing, May 2, 1996.
Guerin, RadioNet Driver Implementation for the Mobile Internet Router, Jun. 1994.
Gupta, A Client Oriented IP Level Redirection, M.S. Thesis, Aug. 1998.
Gupta, Firewall Traversal for Mobile IP, Mar. 17, 1997.
Gupta Secure and mobile networking, Mobile Networks and Applications, vol. 3, Iss. 4, 1998.
Gupta, Solaris Mobile IP: Design and Implementation, Feb. 17, 1998.
Haas, Mobile-TCP: An Asymmetric Transport, Proceedings of ICC'97—International Conference on Communications, Jun. 1997.
Hance, Product Information—Netswitcher, the ultimate windows network setup utility; IP 3 002517; Netswitcher.TM., Developed and Marketed by: J.W. Hance, 1950-18 E. Greyhound Pass, Suite 305, Carmel, Indiana 46033 USA, Aug. 2, 2004.
Harrison, Mobile Multicaset (MoM) Protocol, Proceedings of the 3rd annual ACM/IEEE international conference on Mobile computing and networking, Sep. 26, 1997.
Heilbronner, Nomadic Computing Systems on the Internet—Infrastructure and Management Requirements, Mar. 31, 1997.
Hills, Wireless Data Network Infrastructure at Carnegie Mellon University, Feb. 1996.

Hodes, Composable Ad-hoc Mobile Services for Universal Interaction, Aug. 2, 1997.
Housel, WebExpress: A Client/intercept based system for optimizing Web browsing in a wireless environment, Mobile Networks & Applications, vol. 3, No. 4, Jan. 1999.
Hubbard, Firewalling the Net, BT Technology Journal, vol. 15, Iss. 2, Apr. 1997.
Industry-Leading Internet Access System Now Makes Plug and Play—High-Speed Internet Access for the Road Warrior Easier Than Ever, Jul. 20, 1998.
Inouye, Dynamic Network Reconfiguration Support for Mobile Computers, Proceedings of the 3rd annual ACM/IEEE international conference on Mobile computing and networking, Sep. 26, 1997.
Inouye, Physical Media Independence: System Support for Dynamically Available Network Interfaces, Jan. 20, 1997.
Internet Access: ATCOM/INFO Releases IPORT Central Office Solution. IPORT-CO Makes Plug & Play High-Speed Internet Access Possible too Multiple Properties from a Single Server-Product Announcement, ATCOM-IPORT Press Release, Oct. 26, 1998.
Ioannidis, IP-based Protocols for Mobile Internetworking, Proceedings of the Conference on Communications Architecture & Protocols, Sep. 3, 1991.
Ioannidis, Protocols for Supporting Mobile IP Hosts, Jul. 1992.
ipfwadm-2.3.0, source code module ipfwadm.c, Jul. 30, 1996.
IPORT Central Office Solution, Nov. 1998.
Jain, PC-notebook based mobile networking: Algorithms, architectures and implementations; ICC95 vol. 2, Jun. 1995.
Johnson, Mobile Host Internetworking Using IP Loose Source Routing, Carnegie Mellon University Technical Report No. CS-93-128, Feb. 1993.
Johnson, Protocols for Adaptive Wireless and Mobile Networking, Feb. 1996.
Johnson, Scalable and robust internetwork routing for mobile hosts, Proceedings of the 14th International Conference on Distributed Computing Systems, Jun. 21, 1994.
Johnson, Scalable Support for Transparent Mobile Internetworking, Wireless Networks, vol. 1, Iss. 3, 1995.
Katz, The Bay Area Research Wireless Access Network (BARWAN), Proceedings of the 41st IEEE International Computer Conference, Feb. 25-28, 1996.
Kleinrock, Nomadic Computing (Keynote address) Intl Conf. on Mobile Computing and Networking Berkley, California, ACM., Nov. 1995.
Kleinrock, Nomadic Computing—An Opportunity; Computer Science Department, UCLA, Los Angeles, CA (ACM SIGCOMM, Computer Communications Review, vol. 25, Issue: 1)., Jan. 1995.
Kleinrock, Nomadic Computing; Computer Science Department, UCLA, Los Angeles, CA; (Information Network and Data Communication IFIP/ICCC International Conference on Information Network and Data Communication)., Jun. 1996.
Kleinrock, Nomadicity in the NII; Computer Science Department, UCLA, Los Angeles, CA; (Cross-Industry Working Team Papers & Reports), Jun. 1995.
Kleinrock, Nomadicity: Anytime, Anywhere in a Disconnected World; Computer Science Department, UCLA, Los Angeles, CA; (Mobile Network and Applications, Special Issue on Mobile Computing and System Services, vol. 1, Issue: 4)., Dec. 1996.
Koblas, SOCKS, Proceedings of the Third USENIX UNIX Security Symposium (Baltimore, MD: USENIX Association), Sep. 1992.
Kostick, Building a Linux Firewall (Linux Journal 24), Apr. 1, 1996.
Kostick, IP Masquerading Code Follow-up, System Administration, vol. 1997, Iss. 43, Nov. 1997.
Kostick, System Administration: IP Masquerading Code Follow-Up (Linux Journal archive, vol. 1997, Issue 43, ISSN:1075-3583)., Nov. 1997.
Kunzinger, Network Layer Mobility: Comparison of CDPD and Mobile-IP, IBM Technical Report 29.2003, 1995.
La Porta, Challenges for nomadic computing: Mobility management and wireless communications, Mobile Networks and Applications, vol. 1, Iss. 1, Aug. 1996.
Lain Langdon, Education for Changing Times—An Online Learning Framework, Oct. 15, 1996.

Lee, Adaptive Network Support for Mobile Multimedia, Proceedings of the 1st annual international conference on Mobile computing and networking, Nov. 13, 1995.
Leech, RFC 1928; SOCKS Protocol Version 5, Mar. 1996.
Leu, Implementation considerations for Mobile IP, Proceedings of the 21st International Computer Software and Applications Conference, Nov. 11, 1997.
Li and Leung, Supporting Personal Mobility for Nomadic Computing Over the Internet, ACM SIGMOBILE Mobile Computing and Communications Review, Apr. 1997.
Lin, An Architecture for a Campus-Sized Wireless Mobile Network, Ph.D. Thesis, Dec. 1996.
Lioy, Providing TCP-Level Services to Mobile Computers, M.S. Thesis, 1997.
Loon, Alleviating the Latency and Bandwidth Problems in WWW Browsing, Proceedings of the USENIX Symposium on Internet Technologies and Systems on USENIX Symposium on Internet Technologies and Systems, Dec. 8, 1997.
Maciel, Dynamic Gateways: a novel approach to improve networking performance and availability on parallel servers, Apr. 21, 1998.
Macker, Mobile Ad Hoc Networking and the IETF, ACM SIGMOBILE Mobile Computing and Communications Review, vol. 3, Iss. 1, Jan. 1999.
Major telecom Company Launches Education Internet Service for Schools, Sep. 20, 1995.
Moby Dick, The Mobile Digital Companion, LTR 20422, Jul. 1997.
Mogul, RFC 950; Internet Standard Subnetting Procedure, Aug. 1985.
Moore, Campus World, 1998.
Myles, Comparison of Mobile Host Protocols for IP, Apr. 14, 1993.
Mysore, A New Multicasting-based Architecture for Internet Host Mobility, Sep. 26, 1997.
Nelson, Context-Aware and Location Systems, Jan. 1998.
Neves, Adaptive Recovery for Mobile Enviroments, Communications of the ACM, vol. 40, Iss. 1, Jan. 1997.
Newman, Flow Labelled IP: A Connectionless Approach to ATM, Proceedings of the Conference on Computer Communications (IEEE Infocom), Mar. 24, 1996.
Nomadicity in the National Information Infrastructure, a white paper published by the Cross-Industry Working Team (XIWT) at http://www.xiwt.org/documents/Nomadicity.html.
*Nomadix, Inc.* v. *Second Rule LLC*, Civil Action No. 07-1946 DDP (VBKx), Declaration of Peter Alexander, Ph. D. in Support of Second Rule's Motion for Partial Summary Judgment., Sep. 4, 2008.
Office Action mailed Oct. 5, 2005, for U.S. Appl. No. 09/684,937, Oct. 5, 2005.
Official Communication mailed Nov. 22, 2005 for EP Patent Application No. EP 98 909 121.0, Nov. 22, 2005.
PCT Application and its English translation for Chinese Patent Application No. 98805023.4., Jan. 12, 2005.
Peine, An Introduction to Mobile Agent Programming and the Ara System, University of Kaiserslautern Technical Report ZRI-Report 1/97, 1997.
Perkins, "Providing Continuous Network Access to Mobile Hosts Using TCP/IP." Computer Networks and ISDN Systems, Nov. 1993.
Perkins, A Mobile Networking System Based on Internet Protocol (IP) in USENIX Symposium on Mobile and Location-Independent Computing, Aug. 2, 1993.
Perkins, DHCP for mobile networking with TCP/IP; Proceedings IEEE International Symposium on Computers and Communications, XP002132695, Jun. 27, 1995.
Perkins, Highly Dynamic Destination-Sequenced Distance-Vector Routing (DSDV) for Mobile Computers, ACM SIGCOMM Computer Communication Review, vol. 24, Iss. 4, Oct. 1994.
Perkins, Internet Mobile Host Protocol (IMHP), Jun. 13, 1994.
Perkins, Mobile IP; Communications Magazine, IEEE vol. 35, Issue 5, May 1997.
Perkins, Mobile networking through Mobile IP, IEEE Internet Computing, Jan. 1998.
Perkins, Mobile-IP, AD-HOC Networking, and Nomadicity; Proceedings of the 20th Annual International Computer Software and Applications Conference (COMPSAC), Seoul, Aug. 21, 1996.

Perkins, Mobility Support in IPv6, Proceedings of the 2nd annual international conference on Mobile computing and networking, Nov. 10, 1996.
Perkins, Resource discovery protocol for mobile computing, Mobile Networks and Applications, vol. 1, Iss. 4, Dec. 1996.
Pissinou, A middleware-based architecture to support transparent data access by mobile users in heterogeneous environments, Research Issues in Data Engineering, Feb. 28, 2000.
Pitoura, Building Information Systems for Mobile Environments, Proceedings of the third international conference on Information and knowledge management, Nov. 29, 1994.
Pitoura, Dealing with Mobility: Issues and Research Challenges; Purdue University Computer Science Department Technical Report CSD-TR-93-070, Nov. 1993.
PIX, Network Translation Inc., Private Internet Exchange (PIX) Brochure, 1994.
Plummer, RFC 826, Ethernet Address Resolution Protocol, Nov. 1982.
Poger, Secure Public Internet Access Handler (SPINACH), Proceedings of the USENIX SYmposium on Internet Technologies and Systems, Dec. 8, 1997.
Polydorou, Performance Analysis and Comparison of Two Wireless Wide Area Networks, Dec. 1996.
Poslad, Software Agents for Future Comunnication Systems—Chapter 9: Oriented Middleware for Integrating Customer Network Services, 1999.
Postel, RFC 793, Transmission Control Protocol, Sep. 1981.
Rajagopalan, An Adaptive Location Management Strategy for Mobile IP, Proceedings of the 1st annual international conference on Mobile computing and networking, Nov. 13, 1995.
Rajagopalan, Mobile Internetworking Protocols for Wireless Networks with ATM Backbones, MILCOM '97 Conference Proceedings, Nov. 2, 1997.
Rao, A Proxy-Based Personal Web Archiving Service, ACM SIGOPS Operating Systems Review, Jan. 2001.
Redi, Mobile IP: A Solution for Transparent, Seamless Mobile Computer Communications, Upcoming Trends in Mobile Computing and Communications, Jul. 1998.
Request for Reexamination for U.S. Patent No. 6,130,892, Feb. 15, 2005.
Rigney, RFC 2138, Remote Authentication Dial in User Service (RADIUS), Apr. 1997.
Rizzo, A Dynamic Pricing Framework to Support a Scalable, Usage-based Charging Model for Packet-switched Networks, May 7, 1999.
Robinet, An implementation of a gateway for hierarchically encoded video across ATM and IP networks, Proceedings of the IFIP TC-6 Eigth International Conference on High Performance Networking, Sep. 21, 1998.
Rowe, Reliability of WWW Name Servers, Computer Networks and ISDN Systems, Apr. 1995.
Sato, Details of Functions of Multi-purpose Proxy Server DeleGate-Access/Route Control and Protocol Conversion; Interface vol. 21, No. 9, Sep. 1995.
Schilit, A System Architecture for Context-Aware Mobile Computing, Ph.D. Thesis, May 1995.
Shamsuddin, Positioning of Wireless Broadband, Jun. 1996.
Short, Auto-Porting and Rapid Protyping with Application to Wireless and Nomadic Network Algorithms, A dissertation submitted in partial satisfaction of the requirements for the degree of Doctor of Philosophy in Computer Science, Oct. 26, 1996.
Short, Mobile Wireless Network System Simulation, Wireless Networks, vol. 1, Iss. 4, Nov. 1995.
Stevens, ARP: Address Resolution Protocol; TCP Illustrated, 1994.
Stevens, R, TCP Connection Handshake, 1994.
Stevens, TCP/IP Illustrated, vol. 1, 1994.
Sudan, Gateway Based Approach for Conducting Multiparty Multimedia Sessions over Heterogeneous Signaling Domains, Proceedings of the INFOCOM '97 Sixteenth Annual Joint Conference of the IEEE Computer and Communications Societies Apr. 9, 1997.
Tanenbaum, Computer Networks, Third Edition, May 2000.
Taylor, Internetwork Mobility The CDPD Approach, Jun. 11, 1996.
Teraoka, A Network Architecture Providing Host Migration Transparency, ACM SIGCOMM Computer Communication Review, Sep. 1991.
Teraoka, Host Migration Transparency in IP Networks: The VIP Approach; ACM SIGCOMM Computer Communication Review, vol. 23, Iss. 1, Jan. 1993.
Teraoka, VIP: A Protocol Providing Host Mobility, Communications of the ACM, Aug. 1994.
The Independent, Hardware hustle hits the classroom, May 20, 1996.
Thomsen, Mobile Agents—The new paradigm in computing, ICL Systems Journal, vol. 12, Issue 1, pp. 14-40, May 1997.
TIS Firewall Toolkit Overview, Jun. 30, 1994.
Tut Systems Launches Hotel Internet Management System, PublicPort(™) Latest Addition to Multi-Tenant Unit Product Line Allows Hotel Owners to Use Existing Copper Infrastructure to Provide 'Plug and Play' Internet Services, Jun. 23, 1999.
Varaiya, Index Project Proposal—Executive Summary,INDEX Project Report #98-005P, Aug. 6, 1996.
Venema, TCP Wrapper; Network monitoring, access control, and booby traps, Proc. of the Third USENIX UNIX Security Symposium, USENIX Association, Sep. 1992.
Xylomenos, IP Multicast for Mobile Hosts, IEEE Communications Magazine, vol. 35, Iss. 1, Jan. 1997.
Yeom, IP Multiplexing by Transparent Port-Address Translator, USENIX Tenth System Administration Conference, Sep. 29, 1996.
Zhao, Flexible Connectivity Management for Mobile Hosts, Stanford University Technical Report No. CSL-TR-97-735, Sep. 1997.
U.S. Appl. No. 60/111,497 by Kleinrock, filed Dec. 8, 1998.
Complaint for Patent Infringement of U.S. Patent Nos. 6,130,892; 7,088,727; 6,636,894; 6,857,009 and 6,868,399.

* cited by examiner

GATEWAY DEVICE HAVING AN XML INTERFACE AND ASSOCIATED METHOD

CROSS-REFERENCE TO RELATED APPLICATIONS the present application claims priority from the U.S. provisional patent application bearing application No. 60/161,181 filed Oct. 22, 1999 by Joel E. Short, et al., the contents of which are incorporated herein by reference.

FIELD OF THE INVENTION

The present invention relates generally to a network gateway device and, more particularly, to a network gateway device having an XML interface for communicating with external devices, such as billing and content servers, via XML commands and responses.

BACKGROUND OF THE INVENTION

In order to connect the computer of a user/subscriber to one or more networks or other online services, a variety of gateway devices have been developed. For example, one advantageous gateway device is described by U.S. patent application Ser. No. 08/816,174 and U.S. Provisional Patent Application No. 60/111,497, the contents of both of which are incorporated herein by reference. The gateway device can serve as a gateway to the Internet, an enterprise network, or other networks and/or on-line services. In addition to serving as a gateway, the gateway device can automatically adapt to the protocols and other parameters utilized by the host computer, in order that the host computer may communicate with the network in a manner that is transparent both to the user/subscriber and the network. Once the gateway device has appropriately adapted to the packets coming from the user's computer, the computer can appropriately communicate via the network, such as the network at a hotel, at home, at an airport, or any other location, in order to access other networks, such as the enterprise network, or other online services, such as the internet. In this fashion, the gateway device is capable of providing more efficient network access and network maintenance to the user/subscriber and the network operator.

Gateway devices must therefore communicate with a variety of external devices. For example, gateway devices typically communicate with billing and content servers which present customizable billing options and content pages for every subscriber of the gateway device. With respect to content, billing and content servers can present different log-on screens and pricing to a subscriber based upon one or more attributes associated with the subscriber. For example, a billing and content server can present different log-on screens and pricing based upon the location from which the subscriber accesses the network. In this regard, a subscriber in a suite may be presented with a different log-on screen and pricing options than a subscriber in a regular room or a conference room. Additionally, billing and content servers can present subscribers with customized web content based upon one or more attributes associated with the subscriber. By way of example, a billing and content server can customize the web content based upon the location from which the subscriber accesses the network. In this respect, different fire escape route maps can be presented to the subscriber based upon the room location from which the subscriber accesses the network. Additionally, guests in suites may have access to different web content than subscribers residing in a standard room.

With respect to billing, billing and content servers typically interface with a credit card authorization server in order to obtain credit card information and authorization regarding the various subscribers. Depending upon the billing arrangement of a particular subscriber, the billing and content server can communicate directly with the credit card authorization service in order to appropriately charge the subscriber's credit card account for the various services that the subscriber accesses via the gateway device. Alternatively, the billing and content server can communicate via the gateway device with a network management system, such as the property management system of a hotel, in order to appropriately charge the subscriber's account for the various services that the subscriber accesses via the gateway device.

Billing and content servers can also perform other functions, such as distributing email based upon mailing lists configured according to subscriber-specific information. Billing and content servers can also maintain and update membership records, such as frequent users clubs or frequent visitors clubs.

As briefly mentioned above, gateway devices may also communicate with a network management system, such as the property management system maintained by a hotel or the like. The functions performed by a network management system typically vary based upon the installation and application. For example, typical hotel property management systems automate operations such as room reservations, room assignments, guest check-in and check-out, and other front desk activities. Furthermore, typical hotel property management systems can maintain a log of telephone calls and telephone charges for each guest room, and can be in communication with the Internet to facilitate on-line reservations. As described in a provisional application entitled Systems And Methods For Enabling Network Gateway Devices To Communicate With Management Systems To Facilitate Subscriber Management bearing application No. 60/160,973 filed Oct. 22, 1999 and in a utility patent application entitled Systems and Methods for Integrating A Network Gateway Device with Management Systems filed concurrently herewith, gateway devices oftentimes communicate with network management systems, such as in instances in which the subscriber's access to various networks or on-line services is to be charged to their account that is administered by the network management system. The contents of these applications are also incorporated herein by reference.

Upon requesting access to a particular computer system or on-line service, the gateway device typically determines if the subscriber is entitled to access the computer system, the level of access and/or the type of services to which the subscriber is entitled according to an Authentication, Authorization, and Accounting (AAA) procedure that is described by U.S. patent application Ser. No. 09/458,602 entitled Systems and Methods for Authorizing, Authenticating and Accounting Users Having Transparent Computer Access to a Network Using a Gateway Device filed Dec. 8, 1999 and a patent application entitled Systems and Methods for Providing Dynamic Network Authorization, Authentication and Accounting filed concurrently herewith, the contents of each of which are incorporated herein by reference. An AAA server, which is a database of subscriber records, may be remote to the gateway device or the AAA database may be incorporated into the physical embodiment housing the gateway device. As such, in instances in which the AAA server is remote to the gateway device, the gateway device must also frequently communicate with the AAA server.

In addition to the external devices described above with which the gateway device frequently communicates, gateway devices may also communicate with a wide variety of other external devices depending upon the application. Unfortunately, communications with any of these external devices may be limited due to the particular format in which the external devices are designed to transmit and receive information. Since the external devices are typically designed by a number of different vendors, each of which may prefer a different format for communications, this problem is compounded by the lack of uniformity in the format with which the external devices communicate. In this regard, one external device may be designed to communicate according to one format, while another external device may be required to communicate according to another format. Since the subscriber gateway may be required to communicate with a variety of different external devices, the gateway device would seemingly have to communicate with each external device according to the particular format that is acceptable to the external device. This requirement can quickly prove cumbersome to the design, implementation and efficient operation of a gateway device since it will be forced to communicate according to a number of different formats. While this requirement is a current concern for the efficient utilization of gateway devices that must communicate with multiple external devices, this concern is expected to grow as the variety of applications in which gateway devices are employed increases and the number of different types of external devices with which the gateway device must communicate also grows.

SUMMARY OF THE INVENTION

According to the present invention, a gateway device and associated method are therefore provided that facilitate communications with external devices by utilizing a uniform communications format. As such, the gateway device is not required to communicate with each external device according to a unique format defined by the respective external device. Accordingly, the gateway device and associated method of the present invention improve communications between the subscriber computer, gateway device and various external devices, such as billing and content servers, property management systems, external AAA servers and the like.

According to one aspect of the present invention, a gateway device is provided that includes a subscriber interface for adapting to a subscriber computer that is connected to the gateway device. The subscriber interface facilitates communications between the subscriber computer and at least one network or on-line service without requiring the subscriber computer to be reconfigured and, in particular, without requiring the subscriber computer to support XML commands and responses. According to the present invention, the gateway device also includes an XML interface for communicating with an external device via a series of XML commands and responses. The XML commands and responses can relate to a variety of matters, including various subscriber management matters.

Typically, the XML interface includes a parser front end, a parser section and a building section for appropriately handling XML commands that are received by the gateway device and for sending appropriate responses. The parser front end determines the type of operation requested by the external device. The parser section is responsive to the parser front and organizes elements parsed from either an XML command or an XML response. Once parsed, the XML command is executed. Typically, the parser section passes at least some of the elements to a requested application. Prior to passing the elements to a requested application, however, the parser section typically nests the elements to be passed within an application programming interface (API) wrapper. The building section prepares responses to requests received by the gateway device. Typically, the building section assembles results returned by requested application into an XML response. The gateway device of the present invention can also include an internal web server for communicating with both the XML interface and the internet to thereby facilitate XML-based communications between the gateway device and external devices connected to the internet. As such, the gateway device supports communications involving the subscriber computer and the external devices without ever requiring the subscriber computer to support XML commands and responses.

The present invention also provides a method for communicating between the gateway device and external device via the internet. According to this aspect of the present invention, an XML command is initially received at the gateway device from the external device, such as the billing and content server. The XML command is then parsed, and the parsed XML command is executed, such as by being passed to a respective application program, such as the AAA server for performing the requested function, such as a subscriber management function. Prior to passing the parsed XML command to the respective application program, however, the elements to be passed to the requested application are preferably nested within an API wrapper. Upon completion of the requested function, the application program issues a response that is received by the gateway device and that is then included within an XML response transmitted from the gateway device to the external device.

As such, the gateway device and associated method of the present invention facilitate communications between the subscriber computer, the gateway device and a variety of external devices, such as external billing and content servers, property management systems and external AAA servers. In this regard, the gateway device can communicate with each of these various external devices in a uniform manner via a series of XML commands and responses, thereby dramatically reducing, if not eliminating, the instances in which the gateway device would have to communicate with an external device according to the unique format established by the external device. As a result, the design, implementation and operation of the gateway device should be considerably simplified. However, the gateway device and associated method of the present invention permit the subscriber computer to enjoy the benefits of the common XML command and response format without ever having to be reconfigured to support XML.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
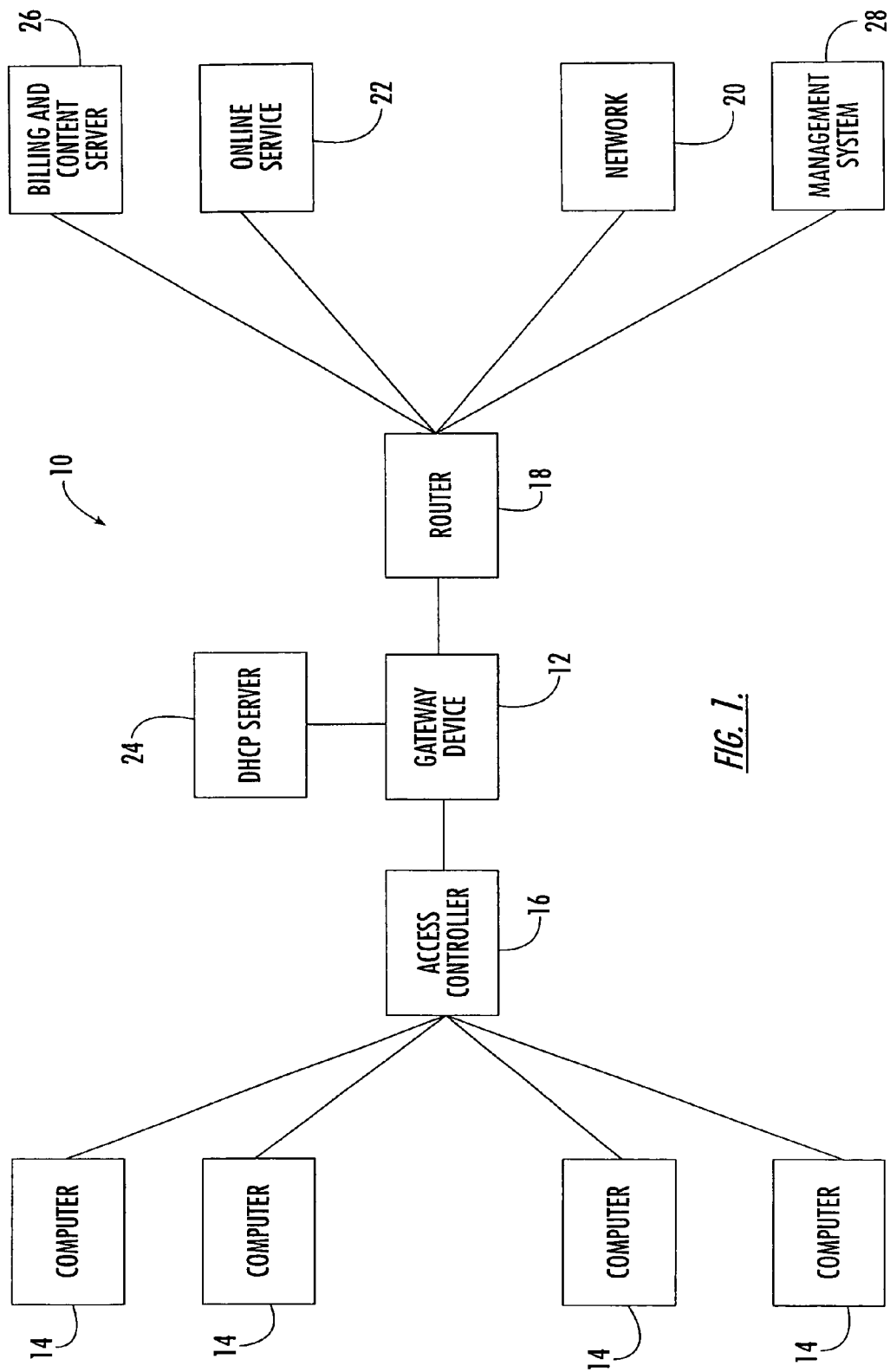
FIG. 1 is a block diagram of a computer system that includes a gateway device for facilitating communications between one or more computers and various other networks or on-line services in a manner that is transparent to both the user/subscribers and the network administrators and internet service providers.

Referring now to FIG. 1, there is shown in block diagram form a computer system 10 including a plurality of computers 14 that can communicate with one or more online services 22 or networks via a gateway device 12 that provides the interface between the computers and the various networks 20 or online services. One embodiment of such a gateway device has been described in U.S. patent application Ser. No. 08/816,174 and U.S. Provisional Application No. 60/111,497 (collectively referred to herein as the Gateway Device Applications), the contents of which have been incorporated herein by reference. Briefly, the gateway device facilitates transparent computer access to the online services or networks, such that the computers can access any networks via the gateway device regardless of their network configurations. The gateway device includes a subscriber interface that adapts to the computer of a user to facilitate communication between the computer and a network or other online service without requiring the computer to be reconfigured. In this regard, the subscriber interface of the gateway device has the ability to recognize computers attempting to access a network, the location of computers attempting to access a network, the identity of users attempting to gain network access, and additional attributes, as is discussed in the Gateway Device Applications.

As illustrated in FIG. 1, the computer system 10 also includes an access concentrator 16 positioned between the computers 14 and the gateway device 12 for multiplexing the signals received from the plurality of computers onto a link to the gateway device. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end (a Cable Modem Termination Shelf (CMTS)) for signals transmitted via coaxial cables, a wireless access point (WAP) for signals transmitted via a wireless network, a switch or the like.

The computer system 10 further includes one or more routers 18 and/or servers (not shown in FIG. 1) to control or direct traffic to and from a plurality of computer networks 20 or other online services 22. While the computer system is depicted to have a single router, the computer system can have a plurality of routers, switches, bridges, or the like that are arranged in some hierarchical fashion in order to appropriately route traffic to and from the various networks or online services. In this regard, the gateway device 12 typically establishes a link with one or more routers. The routers, in turn, establish links with the servers of the networks or online services, based upon the user's selection. It will be appreciated by one of ordinary skill in the art that one or more devices illustrated in FIG. 1 may be combinable. For example, although not shown, the router may be located entirely within the gateway device. Furthermore, additional elements may be included in the computer system, such as elements disclosed in the Gateway Device Application, or network elements known to those of ordinary skill in the art.

Figure 2:
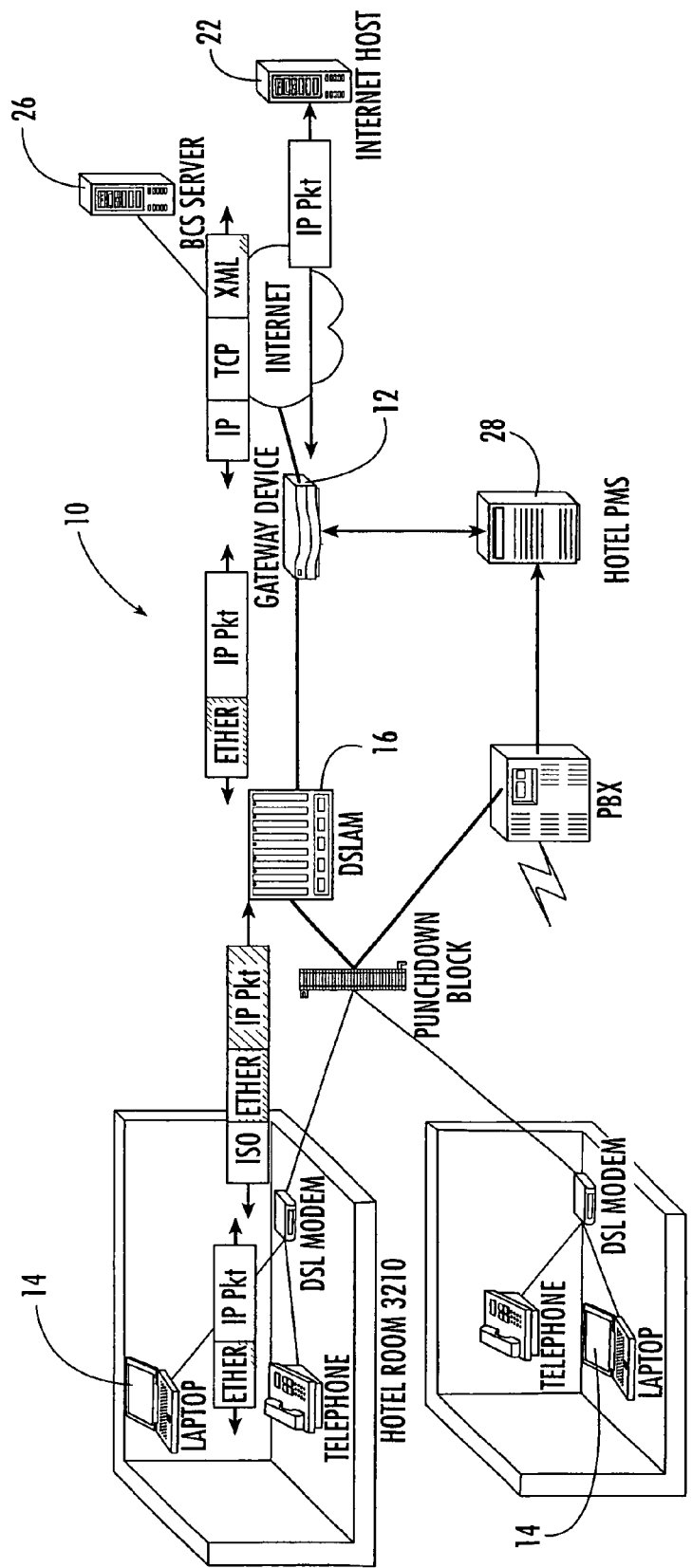
FIG. 2 is a block diagram illustrating the format and protocol of messages transmitted to and from a gateway device according to one embodiment of the present invention, including messages transmitted between the gateway device and a billing and content server.

As described above, gateway devices 14 must typically communicate with a variety of external devices. For example, gateway devices typically communicate with billing and content servers 26 as depicted in FIGS. 1 and 2. As also described above, billing and content servers present customized billing options and content pages for every subscriber of a gateway device. As such, gateway devices must communicate on a frequent basis with the billing and content server.

The gateway device 12 may also communicate with a management system 28, such as the property management system of a hotel or the like. In this regard, FIG. 2 shows a block diagram of the computer system of FIG. 1, integrated with a hotel computer system, according to one embodiment of the present invention. It will be appreciated by those of skill in the art that the embodiment shown in FIG. 2 is for illustrative purposes, and that the computer system may be integrated with virtually any network or network management system, such as computer networks established in corporate offices, airports, arenas, apartment complexes, office buildings or the like. As a result, the embodiment shown in FIG. 2 is for illustrative purposes only, and is not intended to limit the scope of the present invention.

While the functions performed by network management systems 28 vary based upon the installation and the application, typical hotel property management systems automate operations such as room reservations, room assignments, guest check-in and check-out and other front desk activities as described above. In addition, typical hotel property management systems can maintain a log of telephone calls and telephone charges for application to the bill for each guest room. Accordingly, the gateway device 12 of the present invention can communicate with a property management system in order to place charges for the various services that a subscriber accessed via the gateway device upon the appropriate bill that is maintained by the property management system.

Moreover, while the AAA functionality is typically physically embodied within the gateway device 12, the gateway device can be configured to communicate with external AAA servers in order to authenticate a subscriber, to obtain authorization for the services requested by the subscriber and to appropriately account for their usage. In addition, gateway devices may communicate with a wide variety of other external devices, particularly as gateway devices are deployed in new applications or installations.

In order to avoid the overhead associated with communicating with each of these external devices according to the unique format in which the external device is designed to communicate, the gateway device 12 of the present invention communicates with the external devices with a series of commands and responses formatted according to the extensible markup language (XML). As known to those skilled in the art, XML is defined as an application profile of the standard generalized markup language (SGML) that is defined by ISO 8879. While SGML has been the standard, vendor-independent technique to maintain repositories of structured documentation for more than a decade, SGML is not well suited to serving documents over the world wide web. While XML is designed to enable the use of SGML on the world wide web, XML is not a single, predefined markup language. Instead, XML allows the system designer to design their own markup language. In this regard, a predefined markup language, such as hypertext markup language (HTML), defines one manner in which to describe information in one specific class of documents. In contrast, XML allows the system designer to define its own customized markup languages for different classes of documents. As such, XML specifies neither semantics nor a tag set. However, XML provides a facility to define tags and the structural relationships between them. See XML specification 1.0 for further details regarding XML.

XML has conventionally been utilized to facilitate communications between servers, such as for billing purposes, and not to facilitate communications with a user, either directly with a user's computer 14 or through an intermediary such as a gateway device 12. As such, computers are not generally configured to communicate in or to support XML. In order to provide a user with the advantages of XML including the ability to communicate in a common language with a wide variety of network devices without requiring that each computer be reconfigured to support XML, the gateway device 12 of the present invention serves as a proxy for the user's computer and utilizes XML to communicate with a variety of external devices, including the billing and content server 26 and the property management system 28. In addition, in instances in which the AAA functionality resides in an external AAA server, the gateway device can also communicate with the external AAA server via XML. In particular, the gateway device is designed to communicate with the network devices according to a set of XML commands and XML responses, thereby affording the user's computer the advantages offered by XML without requiring the user's computer to be reconfigured to support XML. Since the XML format is not specific to any particular external device, the gateway device can advantageously communicate with a variety of external devices via a common format, i.e., XML, and need not format messages differently based upon the format with which the external device is otherwise designed to communicate.

For example, a user can submit a request to purchase a product from an online provider. According to the present invention and as described in the following examples, the gateway device 12 can then communicate in a common XML format with various network devices, including billing and content servers, to authenticate and authorize the user, to order the product and to account for the user's payment for the product, without ever requiring the user's computer 14 to support XML.

Figure 3:
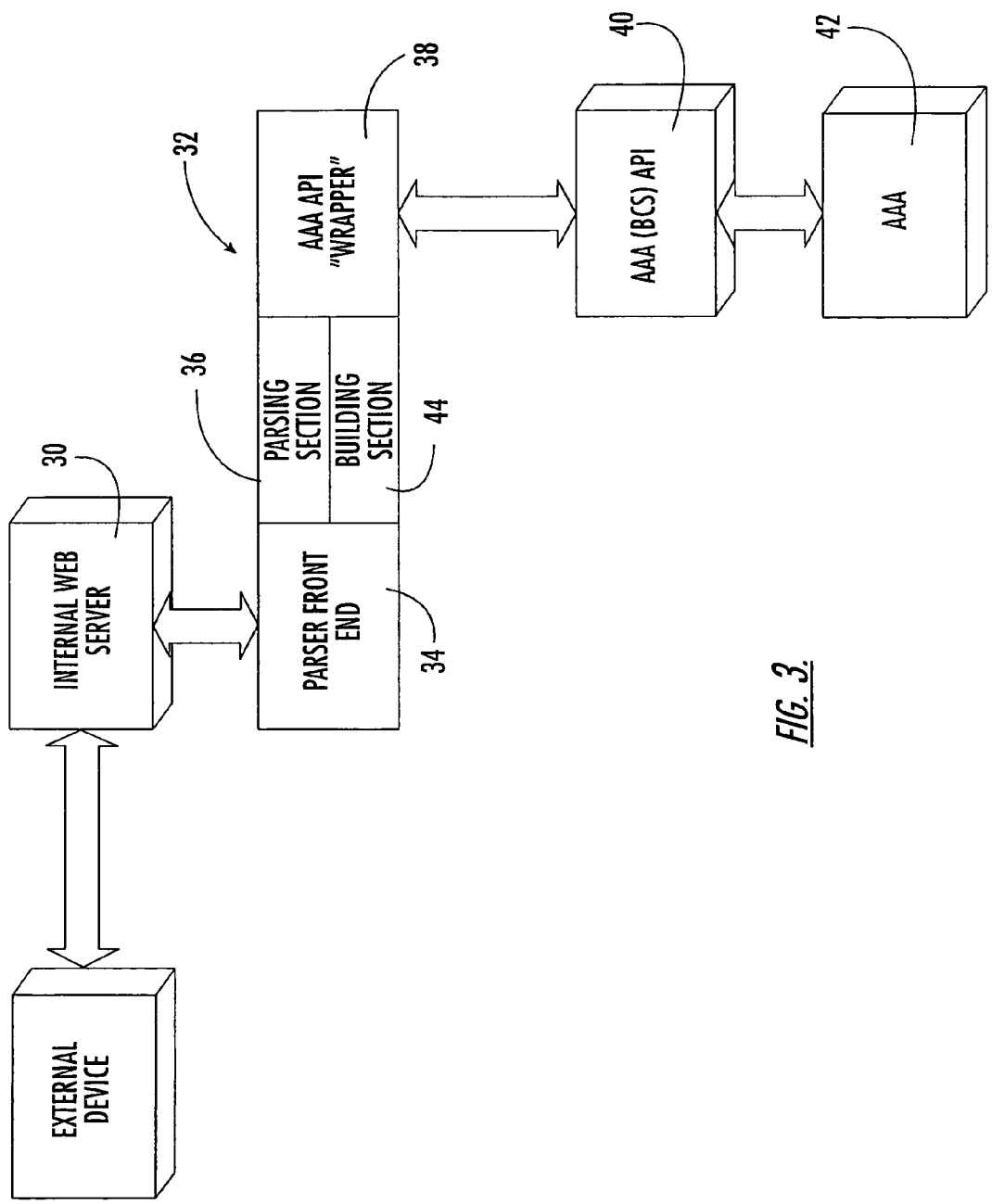
FIG. 3 is a block diagram illustrating an XML interface of a gateway device according to one embodiment of the present invention, as well as the various devices with which the XML interface communicates.

As depicted in FIG. 3, the gateway device 12 typically includes an internal web server 30 that processes HTTP streams that are received from external devices. In instances in which the external device and the gateway device will communicate via the XML protocol, the HTTP string will have XML as the content type, while the content itself will consist of tags, attributes and data. As known to those skilled in the art, tags serve as field identifiers and attributes contain the values of input parameters that are used as record keys or search arguments, i.e., a MAC address. In addition, data elements are values that are to be stored in the tables and authorization files of the gateway device. Data is also returned in response streams sent by the gateway device to the external devices.

Figure 4:
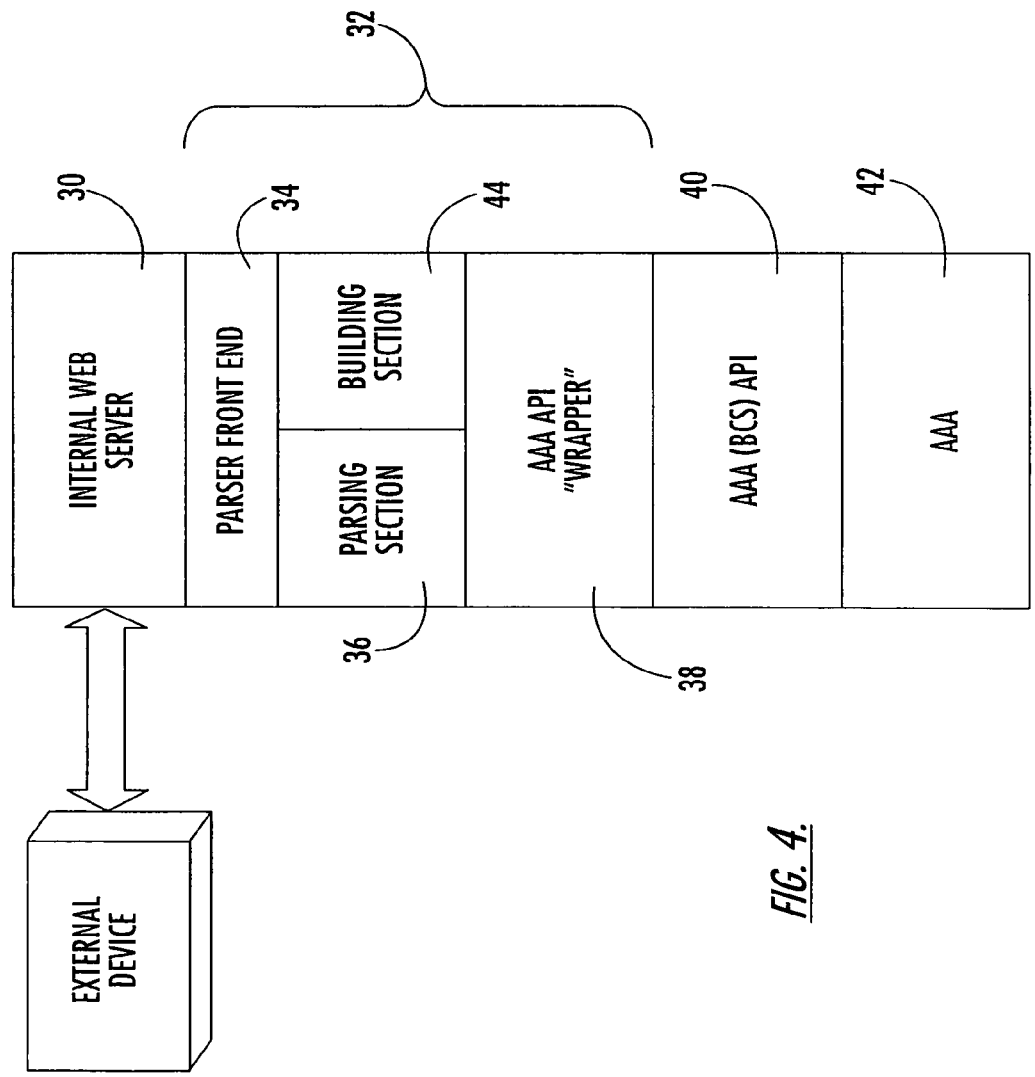
FIG. 4 is a stack representation of the XML interface of FIG. 3 as well as the various devices with which the XML interface communicates so as to illustrate the relative hierarchy between the respective devices.

In order to handle XML commands that are received from an external device, the gateway device 12 includes an XML interface, also known as an XML parser 32, that is typically comprised of software, that is compliant with the world wide web consortium (W3C) standards to validate the XML command strings and the attributes and data derived from an XML query string. As depicted in FIG. 3, an XML interface typically includes a parser front end 34 that is also typically comprised of software and that invokes the core of a parser and determines the type of operation being requested. For example, in one common embodiment, the gateway device will receive an XML command from the billing and content server 26 requesting a specific AAA operation. As such, the following description of the XML interface as well as accompanying FIGS. 3 and 4 will be in terms of XML commands from the billing and content server requesting an AAA operation. However, the XML interface can facilitate XML-based communications between a wide variety of other devices without departing from the spirit and scope of the present invention. In this regard, the only requirement is that the external device has an XML interface, i.e., an XML parser, and be adapted to support the same XML command protocol as the gateway device. One example of an XML protocol for communications between a gateway device and a billing and content server is provided below, although other XML command protocols can be established without departing from the spirit and scope of the present invention.

The XML interface 32 of the gateway device 12 also includes a parser section 36, typically comprised of software, to handle elements as they are parsed from the XML stream. In this regard, parsed elements are organized into separate parameters that are passed to the requested application, such as the AAA server, via an appropriate application program interface (API). As shown in FIG. 3, the sets of parameters that are to be passed to the requested application are typically nested inside or wrapped within a record structure having an appropriate protocol as indicated by block 38 designated as the API "wrapper", that also provides any necessary translation of data elements, e.g. those that need to be converted from string format to some numeric format for internal processing reasons. Once properly wrapped, the sets of parameters are passed via the appropriate API 40 to the requested application, such as the AAA 42. The requested application then responds to the request and provides the requested data via the API to the XML interface of the gateway device.

The gateway device 12 therefore also includes a building section 44 that is also comprised of software and that prepares responses to requests received by the gateway device. In this regard, the building section of the XML interface 32 assembles the results returned by the requested application into a new XML string that will be part of the HTTP response stream returned to the external device via a component such as the aforementioned goahead server. With respect to a HTTP response stream sent back to a billing and content server 26 via the world wide web, the HTTP response stream is typically nested inside a TCP/IP packet in order to be appropriately transmitted and received by the billing and content server. See, for example, FIG. 2 that depicts the relative protocols and formats for signals transmitted between different elements of the overall computer system 10. However, other protocols can be utilized without departing from the spirit and scope of the present invention.

A response that is returned by the gateway device 12 can be one of two types. First, a standard "OK" response can be returned that typically includes the data, if any, requested by the external device. Alternatively, an error response can be returned that typically consists of a numeric error code and a textual description of the error. In either instance, the XML interface 32 generally creates a standard header consisting of the status, such as "OK" or "ERROR", the ID of the gateway device and the gateway device's IP address. This response is then placed onto the world wide web by the internal web server 30 of the gateway device for delivery to the external device.

While the XML interface 32 of the gateway device 12 of the present invention will be primarily described hereinafter in conjunction with XML commands received by the gateway device from an external device, followed by XML responses sent by the gateway device to the external device, the gateway device of the present invention can be constructed so as to initiate XML-based communications by issuing XML commands to various external devices and awaiting appropriate responses. In addition, while the gateway device including an XML interface will primarily be described in conjunction with communications involving an external billing and content server 26 that requests information from the AAA server, the gateway device can establish XML-based communications with other external devices, such as a property management system 28 or, in instances in which the AAA server is external to the gateway device, with the AAA server itself. In any of these instances, the gateway device is able to communicate with the external device or server according to a common protocol, i.e., XML, without having to communicate with each external device in the format unique to the respective external device. As such, the only requirement of the external device is that the external device has an XML interface and be adapted to support the same XML command protocol as the gateway device.

While various XML command protocols can be established depending upon the external device and the nature of the communication between the external device and the gateway device 12, one command protocol established between an external billing and content server 26 and a gateway device is hereinafter provided by way of example and not by way of limitation. In this example, the billing and content server sends XML commands to the gateway device which, in turn, responds to the billing and content server. In one example, the XML commands transmitted by the billing and content server to the gateway device are sent using an HTTP form POST in which the information is placed in packets sent after the HTTP header. In this example, the command text will generally follow the following format:

<USG COMMAND="(command)" [(attr)="(attr_data)"]>
   <(tag_n) [tag_n_attr="(tag_n_attr_data)"]>(data_n)</(tag_n)>
</USG>
where:
   (command) is a gateway device command;
   (attr) is an optional attribute associated with a command;
   (attr_data) is the data associated with the optional attribute tag;
   (tag_n) is a data name tag used for specifying command parameter names;
   (tag_n_attr) is an optional attribute name tag;

(tag_n_attr_data) is optional attribute data, and
   (data_n) is the data associated with a data name tag.

In addition, the typical XML response from the gateway device 12 to a billing and content server 28 following receipt of an XML command from the billing and content server is typically formatted as follows:

| | |
|---|---|
| HTTP/1.1 200 OK | (specifies request understood) |
| Server: UI 3A4B6D | (use the gateway device ID as the server name) |
| Date: Fri, 23 Jul. 1999 00:09:55 GMT | (current date/time) |
| Content-Type: text/xml | (specifies XML content) |
| Last-Modified: Fri, 23 Jul. 1999 00:09:55 GMT | (current date/time) |
| Content-Length: 560 | (size of message body in characters) |
| | (this must be a blank line) |
| (series of XML tag/data pairs) | |
| | (end of message body) |

In this regard, while the series of XML tag/data pairs referenced in the above exemplary XML response format will depend upon the particular command as described below, one series of XML tag/data pairs typically follow the following format:

<USG RESULT="(RESULTCODE)" ID="(UI)" IP="(USG_IP_ADDR)">
   [<ERROR_NUM (error number)</ERROR_NUM>]
   [<ERROR_DESC>(error description)</ERROR_DESC>]
   <(tag_n) [tag_n_attr="tag_n_attr_data"]>(data_n)</(tag_n)>
</USG>
where:
   (RESULTCODE) is either "OK" or "ERROR";
   (UI) is the gateway device ID;
   (USC_IP_ADDR) is the IP address of the gateway device;
   (tag_n) is a data name tag;
   (tag_n_attr) is an optional attribute name tag;
   (tag_n_attr_data) is optional attribute data; and
   (data_n) is the data associated with a data name tag.

As indicated, all XML responses returned following an XML command will contain error information. In this regard, the attribute RESULT will be assigned either "OK" or "ERROR". If an error did occur, two additional tag/data pairs will be added as part of the response form, namely, error_num and error_desc. The error number data will contain an integer number representing the error that occurred, while the error description data will be a readable textual description of the error.

While a variety of commands and responses can be established based upon the foregoing XML command and response formats, examples of several particular commands that could be issued by a billing and content server 26 to the gateway device 12, requesting either room administration or user administration, are provided below. The resulting responses provided by the gateway device are also provided. However, the following commands and responses are for purposes of illustration only and should not be construed as limitations of the type of XML commands and responses that can be formulated.

Regarding room administration, the billing and content server 28 can issue an XML command to set the access mode of a specified room that includes the following command, command attribute, command attribute data, and tag/data pair:

| | |
|---|---|
| Command: | "ROOM_SET_ACCESS" |
| Command attr: | "ROOM_NUMBER" |
| Command attr_data: | Room number (8 char. max string) |
| tag_1: | "ACCESS_MODE" |
| data_1: | "ROOM_OPEN", "ROOM_CHARGE", or "ROOM_BLOCK" |

In response, the gateway device 12 would typically issue a standard XML response indicating that the command was received and implemented appropriately or that an error occurred.

Also with respect to room administration, a billing and content server 26 can issue a command querying the gateway device 12 regarding the access mode of a specified room. In this regard, the query room status command could include the following command, command attribute, and command attribute data:

| | |
|---|---|
| Command: | "ROOM_QUERY_ACCESS" |
| Command attr: | "ROOM_NUMBER" |
| Command attr_data: | Room number (8 char. max string) |

In response, the gateway device 12 could return a standard response, including the following tags and data in which the room access mode is selected from one of "room_open", "room_charge" or the "room_block":

| | |
|---|---|
| tag_1 = | "ROOM_NUMBER" |
| data_1 = | (room number) |
| tag_2 = | "ACCESS_MODE" |
| data_2 = | (room access mode) |

With respect to user administration, the billing and content server 26 can issue a command to add or update a user that has been authorized for access and should now be added to the MAC or some other type of authorization table, that is, a memory table maintained by the gateway device 12. In this regard, one example of an XML command to add/update a user typically includes the following command, command attribute, command attribute data, and tag/data pair:

| | |
|---|---|
| Command: | "USER_ADD" |
| Command attr: | "MAC_ADDR" |
| Command attr_data: | user MAC address (string) |
| tag_1: | "USER_NAME" |
| data_1: | (user name) |
| tag_2: | "PASSWORD" |
| tag_2_attr: | "ENCRYPT" |
| tag_2_attr_data: | "TRUE" or "FALSE" |
| data_2: | (user password) |
| tag_3: | "EXPIRY_TIME" |
| tag_3_attr: | "UNITS" |
| tag_3_attr_data: | "SECONDS", "HOURS", "DAYS" |
| data_3: | (number of expiry units) |
| tag_4: | "ROOM_NUMBER" |
| data_4: | (user's room number) |
| tag_5: | "PAYMENT_METHOD" |
| data_5: | "RADIUS", "PMS", "CREDIT_CARD", or "ROOM_OPEN" |
| tag_6: | "CONFIRMATION" |
| data_6: | (confirmation code/ID) |
| tag_7: | "PAYMENT" |
| data_7: | (amount paid for access) |

In response, the gateway device 12 would typically issue a standard XML response indicating that the command was received and processed appropriately or that an error occurred.

The billing and content server 26 can also issue an XML command to delete a user who is identified by a Subscriber Identifier, such as aMAC address, a user name or an IP address. In this regard, one example of a delete user command typically includes the following command, tag and data:

| | |
|---|---|
| Command: | "USER_DELETE" |
| tag_1: | "USER" |
| tag_1_attr: | "ID_TYPE" |
| tag_1_attr_data: | "MAC_ADDR", "USER_NAME" OR "IP_ADDR" |
| data_1: | if ID_TYPE = "MAC_ADDR" then (user MAC address) |
| | if ID_TYPE = "USER_NAME" then (user name) |
| | if ID_TYPE = "IP_ADDR" then (user IP address) |

In response, the gateway device 12 would typically issue a standard XML response indicating that the command was received and processed appropriately or that an error occurred.

The billing and content server 26 can also query the gateway device 12 for the current user data by issuing an XML command that, in one, example, includes the following command, tag and data:

| | |
|---|---|
| Command: | "USER_QUERY" |
| tag_1: | "USER" |
| tag_1_attr: | "ID_TYPE" |
| tag_1_attr_data: | "MAC_ADDR", "USER_NAME" or "IP_ADDR" |
| data_1: | if ID_TYPE = "MAC_ADDR" then (user MAC address) |
| | if ID_TYPE = "USER_NAME" then (user name) |
| | if ID_TYPE = "IP_ADDR" then (user IP address) |

In response, the gateway device 12 typically uses a standard XML response with the following tags/data pairs:

| | |
|---|---|
| tag_1: = | "MAC ADDR" |
| data_1: = | (user MAC address) |
| tag_2: = | "USER_NAME" |
| data_2: = | (user name) |
| tag_3 = | "IP_ADDR" |
| data_3 = | (user IP address) |
| tag_4: = | "PASSWORD" |
| data_4: = | (user password) |
| tag_5: = | "EXPIRY_TIME" |
| tag_5_attr: = | "UNITS" |
| tag_5_attr_data: = | "SECONDS", "HOURS", "DAYS" |
| data_5: = | (number of expiry units) |
| tag_6: = | "ROOM_NUMBER" |
| data_6: = | (user's room number) |
| tag_7: = | "PAYMENT_METHOD" |
| data_7: = | "RADIUS", "PMS", "CREDIT_CARD", "ROOM" |
| tag_8: = | "DATA_VOLUME" |
| data_8: = | (data transferred by user in Kbytes) |

The billing and content server 26 can also issue a command to check a user's identity, as specified by a MAC address, as one example, against the authorization tables maintained by the gateway device 12 or the associated AAA server. If the user is found either in the MAC or room authorization table of this example, VALID_USER is returned along with the user authorization method, such as RADIUS, property management system (PMS) (in instances in which the fee is to be billed to the user's account), credit card or room (in instances in which the room is opened up for free internet access). If the user was not found in the MAC or room authorization tables, INVALID_USER will be returned. In any event, the XML command issued by the billing and content server typically includes the following command, command attribute and command attribute data:

| | |
|---|---|
| Command: | "USER_AUTHORIZE" |
| Command attr: | "MAC_ADDR" |
| Command attr_data: | user MAC address (string) |

In response, the gateway device 12 typically issues a standard XML response indicating that the command was received and processed appropriately or that an error occurred, and that includes the following tag and data pairs:

| | |
|---|---|
| tag_1: = | "STATUS" |
| data_1: = | "VALID_USER" or "INVALID_USER" |
| tag_2: = | "PAYMENT_METHOD" |
| data_2: = | "RADIUS", "PMS", "CREDIT_CARD", or "ROOM" |

The billing and content server 26 can also issue an XML command requesting user authorization and payment. If the authorization method that the user has selected is RADIUS, then the gateway device 12 will establish communication with the RADIUS server, authenticate the user, charge the user's account, and return the result of the authorization to the billing and content server. If the authorization method chosen by the user is PMS, the gateway device will establish communication with the PMS 28, authenticate the user, have an access fee added to the user's room bill, and return the result of the authorization to the billing and content server. In either event, the XML command issued by the billing and content server to request user authorization payment includes the following command, command attribute, command attribute data and tag and data pairs:

| | | |
|---|---|---|
| Command: | "USER_PAYMENT" | |
| Command attr: | "PAYMENT_METHOD" | |
| Command attr_data: | "RADIUS" or "PMS" | |
| tag_1: | "USER_NAME" | |
| data_1: | (user name) | |
| tag_2 | "PASSWORD" | |
| tag_2_attr: | "ENCRYPT" | |
| tag_2_attr_data: | "TRUE" or "FALSE" | |
| data_2: | (user password) | |
| tag_3: | "EXPIRY_TIME" | - only if METHOD = "PMS" |
| tag_3_attr: | "UNITS" | |
| tag_3_attr_data: | "SECONDS", "HOURS", "DAYS" | |
| data_3: | (number of expiry units) | - only if METHOD = "PMS" |
| tag_4: | "ROOM_NUMBER" | |
| data_4: | (user's room number) | |
| tag_5: | "PAYMENT" | - only if METHOD = "PMS" |
| data_5: | (amount charged for access) | - only if METHOD = "PMS" |

In response, the gateway device 12 issues a standard XML response indicating that the command was received and processed appropriately or that an error occurred, and that includes the following tag and data:

| | |
|---|---|
| tag_1: = | "CONFIRMATION" |
| data_1: = | (confirmation number/ID) |

The billing and content server 26 can also issue an XML command in instances in which a user makes an e-commerce or special service purchase that is to be charged, such as to the user's bill via the property management system 28. In this regard, the billing and content server issues an XML command that includes the following command, command attribute, command attribute data and tag and data pairs.

| | |
|---|---|
| Command: | "USER_PURCHASE" |
| Command attr: | "ROOM_NUMBER" |
| Command attr_data: | (room number) |
| tag_1: | "ITEM_CODE" |
| data_1: | (item code) |
| tag_2: | "ITEM_DESCRIPTION" |
| data_2: | (description of purchase) |
| tag_3: | "ITEM_AMOUNT" |
| data_3: | (amount of item with out tax) |
| tag_4: | "ITEM_TAX" |
| data_4: | (tax charged on item) |
| tag_5: | "ITEM_TOTAL" |
| data_5: | (total amount charged including tax) |

In response, the gateway device will issue a standard XML response indicating that the command was received and processed appropriately or that an error occurred.

Finally, the billing and content server 26 can issue an XML command in order to update cache memory by changing the status of an entry in the memory authorization table, as identified by the MAC address by way of example, from "pending" to "authorized". In this regard, the XML command can include the following command, command attribute, command attribute date and tag and data pair:

| | |
|---|---|
| Command: | "CACHE_UPDATE" |
| Command attr: | "MAC_ADDR" |
| Command attr_data: | user MAC address (string) |
| tag_1: | "PAYMENT_METHOD" |
| data_1: | "RADIUS", "PMS", "CREDIT_CARD", or "ROOM_OPEN" |

In response, the gateway device will issue a standard XML response indicating that the command was received and processed appropriately or that an error occurred.

While the foregoing XML commands and XML responses that would flow between a billing and content server 26 and a gateway device 12 have been provided by way of example in order to illustrate one particular application of the XML interface 32 or XML parser of a gateway device, the gateway device that includes an XML interface according to the present invention can be employed to communicate with the billing and content server according to a wide variety of other commands and responses depending upon the application. In addition, a gateway device that includes an XML interface can also be employed to communicate with a wide variety of other external devices, including a property management system 28, an external AAA server, or other external devices. In addition, the gateway device can be configured to issue the XML commands and to receive XML responses if necessary for the particular application. In any event, a gateway device that includes an XML interface facilitates communication between the gateway device and various external devices in a uniform manner, thereby avoiding having to communicate with each of the external devices according to a unique format established by the vendor of the external device. As a result, the design, implementation operation of the gateway device is greatly simplified and the user is able to reap the advantages provided by XML without having to reconfigure their computer 14 to support XML.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Enabling Network Gateway Devices to Communicate with Management Systems to Facilitate Subscriber Management A system and method for enabling a management system to communicate with a network gateway device to automatically bill a computer operator for access to a computer network, such as a local network. The system includes a computer, and a network gateway device in communication with the computer for connecting the computer to a computer network, wherein the network gateway device maintains data representative of the computer operator's access to the computer network and wherein the network gateway device reconfigures the data. The system also includes a management system connected to said network gateway device for automatically billing the computer operator based upon usage of the computer network, wherein the management system is configured to communicate according to at least one predetermined protocol. The network gateway device reconfigures the data to meet one of the predetermined protocols supported by the management system, and the management system receives the data reconfigured by the network gateway device and utilizes the data reconfigured by the network gateway device for automatic billing purposes. The method for enabling a management system to communicate with a network gateway device to automatically bill a customer for network access includes allowing a computer operator to access a computer network via a network gateway device, collecting data corresponding to a customer's local network access in the network gateway device, storing the data in the network gateway device, reconfiguring the data to a predetermined data format received from a management system, and transmitting the reconfigured data to the management system.

In order for a computer to function properly, the computer must be appropriately configured. Among other things, this configuration process establishes the protocol and other parameters by which the computer transmits and receives data. In one common example, a plurality of computers is networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors.

As described by U.S. patent application Ser. No. 08/816, 174 and U.S. Prov. Pat. App. No. 60/111,497, a universal subscriber gateway has been developed by Nomadix, Inc. of Santa Monica, Calif. The contents of both of these applications are incorporated herein by reference. The gateway device serves as a gateway to a number of networks or other online services. For example, the gateway device can serve as a gateway to the internet, the enterprise network, or other on-line services. In addition to serving as a gateway, the gateway device automatically configures a computer to communicate with the new network in a manner that is transparent to the user. In this regard, the gateway device will download the necessary protocols and other parameters to the computer without any intervention by the operator and without loading any additional software on the computer.

Because high speed access to enterprise networks, the internet and on-line services is a desirable commodity, like long distance telephone service, costs associated with the service are typically passed on to the remote user/subscriber. Therefore, in many instances the remote user/subscriber is concerned with being able to acquire network access and service in the most cost efficient and convenient manner. In this regard, subscriber remote service concerns parallel those concerns of customers utilizing internet service providers for conventional telephone line dial-up internet access. In both cases, computer operators typically want inexpensive, flexible and customer friendly service options. Correspondingly, the gateway device administrator desires the capability to be able to offer the user/subscriber numerous and different service and billing rate options, like those available in conventional dial-up internet access. For example, the remote user in a hotel environment may desire a subscription for only a day, or for the duration of their stay at the hotel. The user/subscriber may be charged on an hourly rate, a daily rate, a weekly rate, or at any other interval. Such flexible plans offer cost savings to consumers and are an attractive incentive to lure customers into buying access time to the enterprise network, online services or the internet.

Unlike conventional dial-up internet access, however, gateway devices permit remote users to access various computer networks and on-line services without having a prior service contract or an ongoing relationship with the service provider. Therefore, unlike conventional dial up access plans, which can bill subscribers on a set monthly schedule, gateway devices make recouping remote access charges more challenging. This is especially true for nomadic users, who may utilize a remote connection to a network only once before relocating. Once the traveler has moved onward, the network provider may have difficulty in collecting any unpaid service charges. Furthermore, billing of nomadic users is another hurdle to fast and easy access to the enterprise network, on-line services and the internet. The benefits of remote plug and play access therefore may be overshadowed by time consuming payment methods. For example, where a computer operator is required to complete an onerous billing procedure to pre-purchase local network time or to pay for the network use after each session, the computer operator may decide not to use the network.

Thus, any convenience provided by the computer network is superseded by the inconvenient billing method. Gateway device administrators also desire convenient methods in which to bill users/subscribers. Because the gateway device enables subscribers immediate plug and play connections to computer networks, such as hotel or airport networks, the computer network provider and/or service provider of the high speed network would like to quickly and immediately bill the users/subscribers. This billing should be able to easily track a user/subscriber's usage of the network so as to recoup costs for the network hardware and network connection. Furthermore, such billing should be automated such that system administrators do not need to individually bill each remote user.

Therefore, it is desirable for customers, network providers and service providers to implement automatic billing through the computer network so that users may be billed automatically. Such automatic billing of remote and nomadic users would benefit customers by facilitating fast and easy access, and also would benefit network providers who could appropriately charge customers for obtaining remote access.

The present invention relates generally to a network gateway device and, more particularly, to network gateway devices communicating with management systems, such as hotel property management systems, to facilitate subscriber management. The connection of the users to the system can be transparent for billing purposes, although the computer network may also provide services to the users through the management system.

According to one embodiment of the invention, there is provided a system for enabling a management system to communicate with a network gateway device on order to automatically bill a computer operator for access to a computer network such as a local network. The system includes a computer, and a network gateway device in communication with the computer for connecting the computer to a computer network and for maintaining data representative of the computer operator's access to the computer network. The system also includes a management system connected to the network gateway device that is designed to automatically bill the computer operator based upon their access to the computer network. The management system is also designed to communicate with a third party device according to at least one predetermined protocol. According to the present invention, the gateway device is therefore designed to supply billing data using one of the predetermined protocols supported by the management system. As such, the management system receives the billing data supplied by the network gateway device and utilizes the data for automatic billing purposes.

Furthermore, in the system for enabling a management system to communicate with a network gateway device to automatically bill a computer operator for access to a computer network, the management system can be located within the computer network. Additionally, the system can include a translator in communication with the gateway device and management system for receiving the data supplied by the network gateway device. The translator can further reconfigured the supplied billing data received from the network gateway device, and can transmit the further reconfigured data to the management system. The data representative of the computer operator's access to the computer network can include data representative of the computer operator's location, access time, date which access was obtained, billing rate, and other pertinent information.

According to another embodiment of the invention, a method for enabling a management system to communicate with a network gateway device in order to automatically bill a customer for access to a computer network, such as a local network, is provided. The method comprises allowing a network administrator to access a computer network via a network gateway device, and collecting data corresponding to a customer's local network access in the network gateway device. Furthermore, the method of the present invention comprises storing the data in the network gateway device, reconfiguring the data to one of the predetermined data formats which may be received by a management system, and transmitting the reconfigured data to the management system.

The ability to bill customers for service automatically and track customers without system intervention allows the local network service provisioning to be done economically and efficiently. This invention provides an incentive for hotels, airports, and other computer networks to provide network connections to users because the computer network has a captive customer base. Furthermore, automatic billing can enable usage-based billing for network access and services, which is desirable to customers. Finally, automatic billing can reduce the risk of network use by an unauthorized user.

Figure 5:
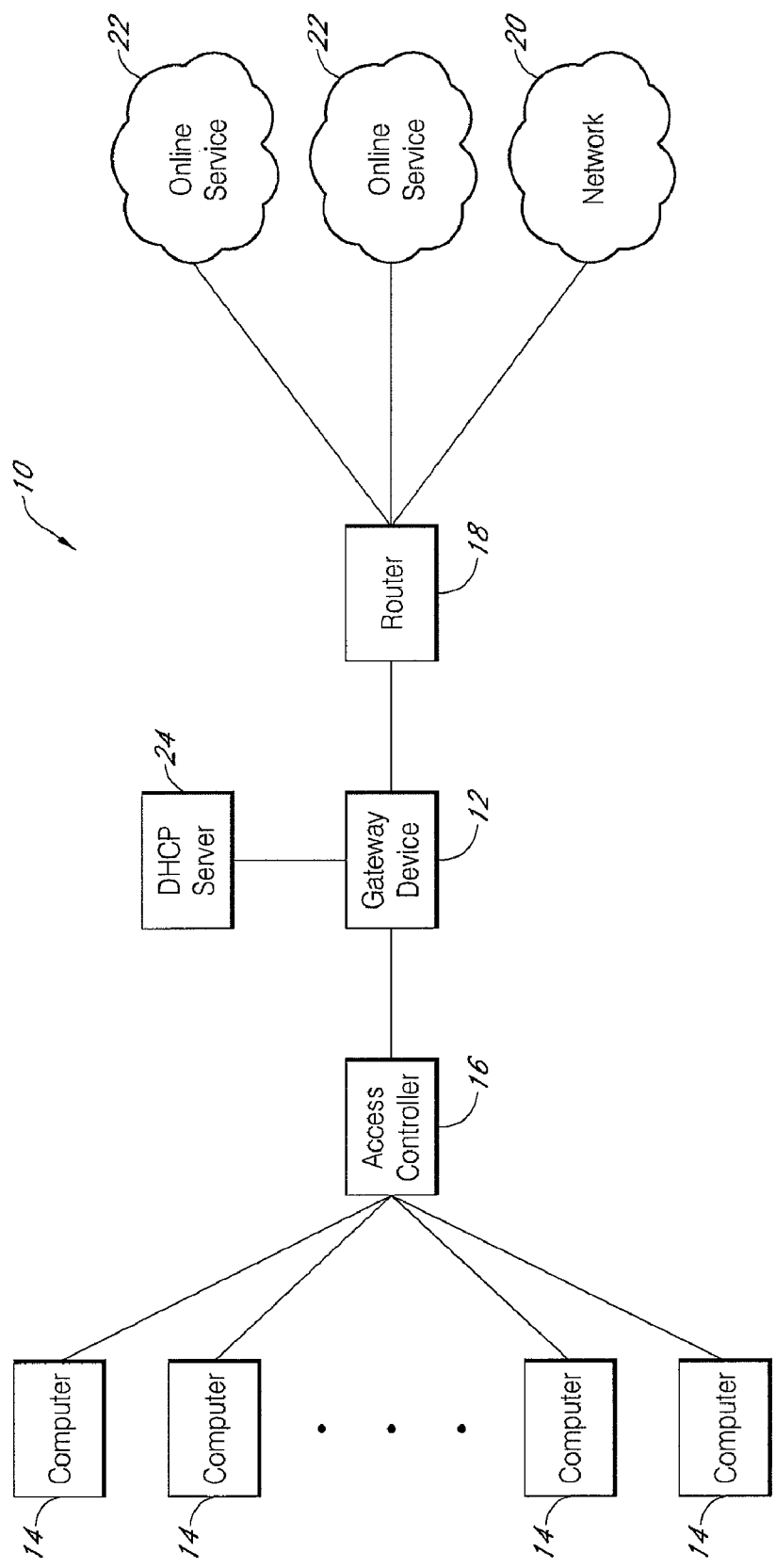
FIG. 5 is a block diagram of a computer system that includes a gateway device for automatically configuring one or more computers to communicate via the gateway device with other networks or other online services, according to one embodiment of the present invention.

Referring now to FIG. 5, the computer system 10 that includes a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel or a multi-dwelling unit. Alternatively, the computers 14 can be plugged into ports in an airport, an arena, or the like. The gateway device 12 provides an interface between the plurality of computers 14 and the various networks 20 or other online services 22.

Most commonly, the gateway device 12 is located near the computers 14 at a relatively low position in the overall network (i.e., the gateway will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access controller 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access controller 16 positioned between the computers 14 and the gateway device 12 for multiplexing the signals received from the plurality of computers onto a link to the gateway device 12. Depending upon the medium by which the computers 14 are connected to the access controller, the access controller 16 can be configured in different manners. For example, the access controller can be a digital subscriber line access module (DSLAM) for signals transmitted via regular telephone lines, a cable head end for signals transmitted via coaxial cables, a wireless access point (WAP) for signals transmitted via a wireless network, a CMPS, a switch or the like. As also shown in FIG. 5, the computer system 10 typically includes one or more routers 18 and/or servers (not shown in FIG. 5) of a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or other online services 22. In this regard, the gateway device 12 typically establishes a link with one or more routers. The routers, in turn, establish links with the servers of other networks or other online service providers, such as internet service providers, based upon the subscriber's selection. It will be appreciated by one of ordinary skill in the art that one or more devices illustrated in FIG. 5 may be combinable. For example, although not shown, the router 18 may be located entirely within the gateway device 12.

The gateway device 12 is specifically designed to allow computers to log onto the computer network in a manner that is transparent to the subscriber In the typical computer network that employs dynamic host configuration protocol (DHCP) service, the DHCP server 24 will initially assign an IP address to a computer that is logging onto the computer network. Upon opening their web browser or otherwise attempting to access an on-line service, the gateway device 12 will direct the subscriber to enter their ID and password. The gateway device 12 then determines if the subscriber is entitled to access the computer system, the level of access and/or the type of services to which the subscriber is entitled according to an authentication, authorization and accounting procedure that is described by U.S. patent application Ser. No. 08/816, 174 and U.S. Provisional Application No. 60/111,497. Assuming that the subscriber has been authenticated and has authorization, the gateway device 12 typically presents new subscribers with a home page or control panel that identifies, among other things, the online services or other computer networks that are accessible via the gateway device 12. In addition, the home page presented by the gateway device 12 can provide information regarding the current parameters or settings that will govern the access provided to the particular subscriber. As such, the operator can readily alter the parameters or other settings in order to tailor the service according to their particular application. Typically, changes in the parameters or other settings that will potentially utilize additional resources of the computer system will come at a cost, such that the gateway device 12 will charge the subscriber a higher rate for their service. For example, a subscriber may elect to increase the transfer rate at which signals are transmitted across the computer network and pay a correspondingly higher price for the expedited service.

The home page also permits the subscriber to select the computer network 20 or other online service 22 that the subscriber wishes to access. For example, the subscriber can access the enterprise network on which the computer is typically resident. Alternatively, the subscriber can access the internet or other on-line services. Once the subscriber elects to access a computer network or other online service, the gateway device 12 establishes the appropriate links via one or more routers 18 to the desired computer network or online service.

Thereafter, the subscriber can communicate freely with the desired computer network 20 or other online service 22. In order to support this communication, the gateway device 14 generally performs a packet translation function that is transparent to the subscriber. In this regard, for outbound traffic from the computer 12 to the computer network or other online service, the gateway device 12 changes the content of the packet, such as the source address, checksum, and application specific parameters, such that all outgoing packets will be directed back to the gateway device 12 rather than to the computer. In contrast, the inbound traffic from the computer network or other online service that arrives at the gateway device 12, which is really intended for the computer, is passed through the translation function so the packets eventually delivered to the computer appear to have been sent directly to the computer. As such, the computer will be completely unaware of the translation being performed by the gateway device. Additional information regarding the translation function is provided by U.S. patent application Ser. No. 08/816,714. By utilizing the gateway device 12 to communicate with the computer network or other online service, however, the subscriber will never have had to configure their computer 12 since the gateway device automatically adopts the computer in a manner that is transparent to the subscriber.

Figure 6:
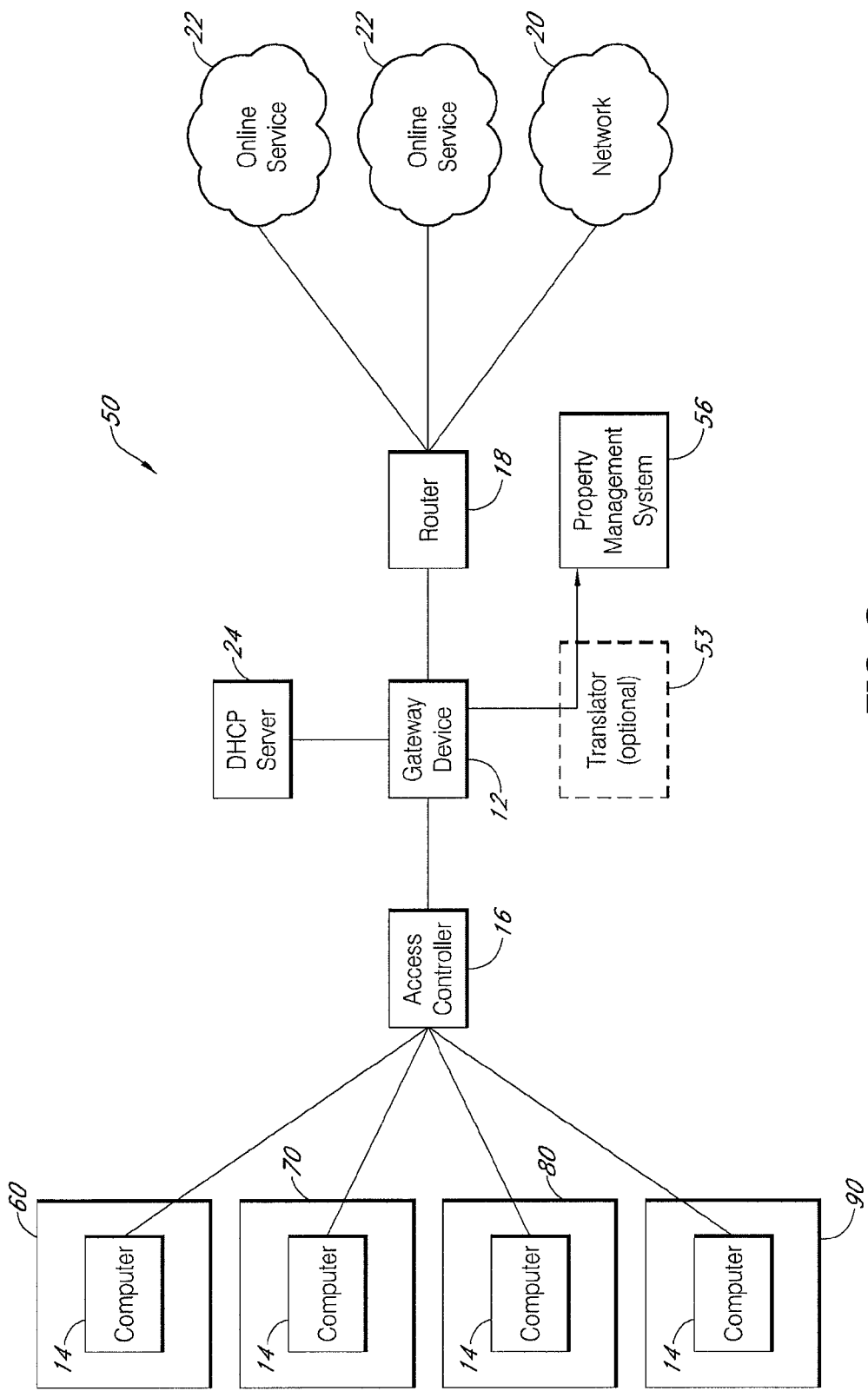
FIG. 6 shows a block diagram of the computer system of FIG. 5, implemented in a hotel computer system, according to one embodiment of the invention.

FIG. 6 shows a block diagram of the computer system 10 of FIG. 5, implemented in a hotel computer system 50, according to one embodiment of the present invention. It will be appreciated by those of skill in the art that the embodiment shown in FIG. 6 is for illustrative purposes, and that the computer system 10 may be implemented with respect to computer networks established in airports, arenas, apartment complexes, office buildings or the like. The hotel computer system 50 is essentially identical to the computer system 10 shown in FIG. 6, except that the gateway device 12 is also connected to a property management system 56. The gateway device 12 may be connected to the property management system 56 through a translator 53, which is illustrated with phantom lines because the translator 53 is an optional component in the hotel computer system 50, as will be explained in detail below. Because the hotel computer system 50 comprises similar components to the system illustrated in FIG. 5, it will be appreciated that the systems can be implemented in like manners with like components. Furthermore, additional embodiments of the present invention discussed with respect to FIG. 5 may be implemented in the system 50 shown in FIG. 6.

As shown in FIG. 6, each of the plurality of computers 14 is located in a different hotel room 60, 70, 80 and 90 to allow multiple guests to access the hotel's computer network. The computers 14 are connected to the access controller 16 through a communications port in each room using a communications device such as a DSL modem, an ethernet card, a coaxial cable, or another well known communication device. Most preferably, the connection between the computers 14 and the access controller 16 is a high speed connection, so that the computers 14 can receive data as fast as the gateway device 12 can forward the data. The data transmitted from the gateway device 12 to the computers may originate from any devices located within the computer network or any devices in communication with the computer network, such as the internet. As with any multiple link communication system, the rate at which data is received by the computers 14 will be no higher than the slowest baud rate over any link in the system.

The gateway device 50 is in direct communication with the management system 56. Management systems may include any well known computer based systems implemented in hotels, airports, arenas or other venues to manage operations. In the embodiment of FIG. 6, the management system is a property management system located within a hotel. Typical hotel property management systems automate operations such as room reservations, room assignments, guest check-in and check-out, and other front desk activities. Furthermore, typical hotel property management systems can maintain a log of telephone calls and telephone charges for each guest room, and can be in communication with the internet to facilitate on-line reservations. Such management systems are typically implemented through the use of one or more conventional computers that are interconnected to form a network. The management system 56 shown in FIG. 6 is illustrative of one such system. As will be appreciated by those of skill in the art, the management system can be located within, and in direct communication with, the computer network.

In the embodiment of FIG. 6, the gateway device 50 is in communication with the property management system 56 such that each user/subscriber's access and connection to the hotel network via the gateway device 12 can be easily monitored by the property management system 56. Preferably, the gateway device 12 is connected to the property management system 56 through a serial port interface. The connection may operate at a variety of baud rates, although 2400 or 9600 bits per second are typical. The main purpose for the connection is to allow the hotel to bill each specific user/subscriber for their use and connection to the hotel's network, and to automatically bill such use directly to the room from which access was obtained. The property management system 56 can monitor and record information such as the identity of the user, the room from which the user obtained access, the amount of time that the user utilized the network, the cost of each network access, the time, date and duration of the network access, and other additional information. As a result, the present invention offers user/subscribers of a computer network convenient payment plans in which a user does not have to pre-pay for network access or physically pay each time the network is accessed.

As will be appreciated by those of skill in the art, the information passed from the gateway device 12 can be, in most respects, identical to information received by the property management system 56 from a private branch telephone system (PBX), which are commonly utilized in hotels. PBX systems allow room to room, local and long distance telephone calls to be made by guests, and are typically connected to hotel property management systems to facilitate billing of hotel guests based upon the room in which the call is made. Charges for such use can then be paid by the guest upon checkout, automatically billed to the guest's credit card or automatically billed to the guest with room charges.

As can be appreciated with reference to FIG. 6, the property management system 56 can be in communication with additional devices other than the computer gateway system 10 of the present invention. As noted above, the property management system 56 can be directly connected to a PBX, which is, in turn, connected to each telephone located in every hotel room. Additionally, although not illustrated, the property management system 56 can be connected to additional third party components, such as pay per view television, credit card authorization systems and point of sale systems. These connections may be through serial ports, modem communications, or through other well known communication means. Such connections allow the management system to function as a fully integrated system, which allows customers to use a variety of hotel resources, while transparently being billed for each transaction.

Through the property management systems, a user/subscriber's account may be billed directly to that user's hotel bill. For example, where the management system receives data representing a computer operator's access to the local system, the management system can automatically bill the operator through the use of a credit card authorization system in communication with the property management system. In this manner, the customer's payment can be fast, easy, automated and transparent to the user.

Traditional hotel property management systems are configured to communicate with various third party systems, such as point of sale systems, PBX systems, pay per view systems, and credit card authorization servers, as noted above. Hotel property management systems are generally configured to receive such communications because these third party systems are typically used in the vast majority of hotels. To receive data from each of these third party systems, management systems typically include software for communicating with the third party systems based upon the data protocol and data structure implemented by the management system. The software allows data from third party systems to be received and reconfigured, if necessary, so that the data is in a format appropriate to be utilized by the management system 56. However, because typical management systems that are currently deployed are not designed to receive data from a gateway device 12, the gateway device 12 is preferably designed to interface with the management system 56 without requiring additional programming of the management system software.

The gateway device 12 of the present invention formats data such that the data has the same data protocol and data structure as that of a third party service, such as a PBX, that the management system 56 is already designed to receive. The management system 56 is adapted to communicate using different protocols, through technology known as COM objects. Thus, the gateway device 12 can masquerade as a PBX or another third party system. The gateway device 12 receives a data record corresponding to an individual user/subscriber's use of the computer system, including the user/subscriber's location (room number), access time, and additional information, as discussed above. The gateway device 12 stores this information and modifies the data record to fit the proper format required by the property management system vendor. Although the format of the data is changed, no data is changed in the modification. The reconfigured data is then transmitted to the management system 56. This data can be in a call accounting record (CAR) and low level protocol (LLC) format, data formats typical of third party systems such as PBXs. Such formats are well known to those of skill in the art of property management system design.

Because management systems can differ, each system utilizing different user interfaces, variables, and operating systems, the gateway device should communicate data to the property management system 56 using data formats acceptable to a large number of management systems. In this manner, the gateway device 12 may be compatible with a majority of property management systems. For example, the gateway device 12 may be preconfigured to operate with the most popular management systems and formats, such as Micros Fidelio (manufactured by MICROS Systems, Inc., Beltsville, Md.), HOBIC, AutoClerk (manufactured by AutoClerk, Inc., Lafayette, Calif.), and other well known systems and formats.

However, there are many different management system standards, none of which are universal and implemented in all property management systems. As a result, although the gateway device 12 can configure data to conform to a large number of differing management systems, the gateway device 12 may not be able to conform to some systems. As a result, a translator 53 may be optionally used to manipulate the data output by the gateway device 12 in such a manner as to allow the data to be utilized by the property management system 56. In one embodiment, the translator may comprise a Lodging Link II device (LL) (manufactured by Protocol Technologies, Inc., Scottsdale, Ariz.) to convert incoming data from the gateway device 12 to data acceptable to the property management system device, such as UHALL protocol. Additionally, the translator may also be connected to one or more devices or systems in communication with the property management system, such as the pay per view system or credit card authorization system, to format data output by any system or component having data protocols which differ from those of the management system 56.

Because data may be transferred to the management system in a CAR format, data typically within such format must be altered to accurately reflect the computer network service being provided to the user/subscriber. For example, in PBX systems, CAR format usually includes the phone number to which a telephone call is being made. However, when a user/subscriber is obtaining access to the hotel network via the gateway device 12, no telephone number is dialed or called. Therefore, when possible, data within the CAR format (i.e., telephone record), such as telephone numbers, may be replaced with a descriptive record that indicates some other data that the property management systems wish to track or record. On the other hand, where the CAR records cannot be replaced, a bogus field, such as a bogus telephone number, may be included so that the property management system receives the entire record it is programmed to receive. Thereafter, the bogus number is not utilized by the management system 56. Additional problems may also exist, for example, where the management system 56 is not devised to support the non-numeric ASCII characters typically transmitted by the gateway device 12. In this situation, the gateway device can be configured to replace the ASCII characters with numeral designations.

Once the data transmitted by the gateway device is received by the property management system 56, the property management system can display the data using a management system interface. Preferably, the data may be displayed in an easily readable and printable form to allow a user/subscriber to view a summary of access information. Additionally, the data should be accessible to the user/subscriber's accounting record. In this manner, charges due to network access may be automatically placed on a customer's pre-existing bill, such as a hotel bill. Where access is obtained at another location, such as at an airport, the airport system manager (i.e., equivalent to the hotel property management system in the above example) may automatically bill the customer, can automatically charge the customer's credit card, or can add the charges to an account which the customer maintains. In this regard, while the property management system 56 has primarily been described in conjunction with a hotel computer network, the property management system can be utilized in a variety of other applications in which a user/subscriber obtains access to a computer network or other on-line service via a gateway device.

That which is claimed:

1. A method of providing services to users, the method performed at a network system configured to provide the users with access to the internet, the network system in communication with a billing and content server and with a hotel property management system, the method comprising:
providing a subscriber computer with access to at least one network via the network system;
adapting, at the network system, to the subscriber computer to facilitate communications between the subscriber computer and the at least one network;
receiving an XML command at the network system from the billing and content server;
parsing the XML command to determine a type of operation requested by the billing and content server and to determine a user associated with the XML command;
translating at least a portion of the XML command to produce data in a call accounting record format configured to be compatible with a protocol associated with the hotel property management system;
transmitting the data in the call accounting record format to the hotel property management system, the data in the call accounting record format configured to authorize and bill an account associated with the user;
receiving an authorization result from the hotel property management system;
translating the authorization result to produce an XML response indicating that the XML command was received and processed appropriately; and
transmitting the XML response from the network system to the billing and content server, the XML response comprising a confirmation identifier based on the authorization result.

2. The method of claim 1, wherein communicating with the hotel property management system comprises transmitting a second XML command to the hotel property management system.

3. A computing system configured to manage services provided to users, the system comprising:
one or more computer processors;
one or more communications links configured to communicate with a billing and content server and with a hotel property management system;
a subscriber interface configured to provide a subscriber computer with access to at least one network and to adapt to the subscriber computer to facilitate communications between the subscriber computer and the at least one network; and
an XML processing module, configured to cause the one or more computer processors to perform operations comprising:
receiving an XML command from the billing and content server;
parsing the XML command to determine a type of operation requested by the billing and content server and to determine a user associated with the XML command;
transmitting data, in a format specific to the hotel property management system, to the hotel property management system to authorize and bill an account associated with the user in accordance with data in the XML command;
receiving an authorization result from the hotel property management system; and
transmitting an XML response to the billing and content server, the XML response comprising a confirmation identifier based on the authorization result.

4. The computing system of claim 3, wherein communicating with the hotel property management system comprises transmitting a second XML command to the hotel property management system.

5. The computing system of claim 3, wherein the XML command includes data representing a payment amount and a room number.

6. The computing system of claim 3, wherein the format specific to the hotel property management system is a call accounting record format.

7. The computing system of claim 3, wherein the XML processing module is further configured to generate data in a plurality of formats each specific to a type of hotel property management system, to thereby enable communication with the plurality of types of hotel property management systems.

8. The computing system of claim 3, wherein the XML command comprises an identifier of a hotel room number associated with the user, and wherein the data in the format specific to the hotel property management system comprises an identifier of a hotel room number based on the hotel room number included in the XML command.

9. The method of claim 1, wherein the format specific to the hotel property management system includes a telephone number, and wherein translating at least a portion of the XML command to produce data in a call accounting record format comprises including descriptive data in the place of the telephone number.

10. The method of claim 1, wherein the XML command comprises an identifier of a hotel room number associated with the user, and wherein the data in the call accounting record format comprises an identifier of a hotel room number based on the hotel room number included in the XML command.

11. A non-transitory computer-readable medium, comprising instructions configured to cause a computer processor to perform a method comprising:
receiving an XML command from a Billing and Content Server (BCS);
parsing the XML command to determine a type of operation requested by the BCS and to determine a user associated with the XML command;
translating at least a portion of the XML command to produce a Call Accounting Record (CAR) command configured to be interoperable with a CAR protocol associated with a Property Management System (PMS), the CAR command being different from the XML command, the CAR command comprising an identifier of the user associated with the XML command and further comprising billing information;
transmitting the CAR command to the PMS;
receiving an authorization result from the PMS;
generating an XML response based on the received authorization result, the XML response indicating that the XML command was received and processed appropriately; and
transmitting the XML response to the BCS.

12. The non-transitory computer-readable medium of claim 11, wherein the CAR command is configured to appear to originate from a Private Branch Telephone System (PBX).

13. The non-transitory computer-readable medium of claim 11, wherein the CAR protocol requires a telephone number record, and the CAR command comprises a descriptive record in the place of a telephone number record.

14. The non-transitory computer-readable medium of claim 11, further comprising instructions configured to cause the computer processor to produce CAR commands specific to a plurality of CAR protocols, to thereby enable communication with a plurality of types of Property Management Systems.

15. The non-transitory computer-readable medium of claim 11, wherein determining the user associated with the XML command comprises determining a MAC address associated with the XML command and identifying, in an authorization database, a user associated with the MAC address.

* * * * *

UNITED STATES PATENT AND TRADEMARK OFFICE
CERTIFICATE OF CORRECTION

| | |
|---|---|
| PATENT NO. | : 8,190,708 B1 |
| APPLICATION NO. | : 09/693512 |
| DATED | : May 29, 2012 |
| INVENTOR(S) | : Short et al. |

It is certified that error appears in the above-identified patent and that said Letters Patent is hereby corrected as shown below:

Title Page, Item (56) in column 2 (page 2) at line 21, Under U.S. Patent Documents, change "Crosskey e" to --Crosskey et al.--.

Title Page, Item (56) in column 2 (page 5) at line 14, Under Other Publications, change "Defendants's" to --Defendant's--.

Title Page, Item (56) in column 1 (page 6) at line 70, Under Other Publications, change "Inc'," to --Inc.,--.

Title Page, Item (56) in column 1 (page 7) at line 43, Under Other Publications, change "Insitute" to --Institute--.

Title Page, Item (56) in column 1 (page 7) at line 48, Under Other Publications, after "20," insert --21 August 1996,--.

Title Page, Item (56) in column 2 (page 7) at line 14, Under Other Publications, change "Solutionic" to --SolutionInc--.

Title Page, Item (56) in column 2 (page 7) at line 25, Under Other Publications, change "Solutionic" to --SolutionInc--.

Title Page, Item (56) in column 2 (page 7) at line 31, Under Other Publications, change "Solutionic" to --SolutionInc--.

Title Page, Item (56) in column 2 (page 7) at line 37, Under Other Publications, change "Solutionic" to --SolutionInc--.

Title Page, Item (56) in column 2 (page 7) at line 43, Under Other Publications, change "Solutionic" to --SolutionInc--.

Title Page, Item (56) in column 2 (page 7) at line 49, Under Other Publications, change "Solutionic" to --SolutionInc--.

Signed and Sealed this
Twenty-ninth Day of January, 2013

David J. Kappos
*Director of the United States Patent and Trademark Office*

CERTIFICATE OF CORRECTION (continued)
U.S. Pat. No. 8,190,708 B1

Title Page, Item (56) in column 2 (page 7) at line 55, Under Other Publications, change "Solutionic" to --SolutionInc--.

Title Page, Item (56) in column 2 (page 7) at line 61, Under Other Publications, change "Solutionic" to --SolutionInc--.

Title Page, Item (56) in column 2 (page 7) at line 67, Under Other Publications, change "Solutionic" to --SolutionInc--.

Title Page, Item (56) in column 2 (page 7) at line 73, Under Other Publications, change "Solutionic" to --SolutionInc--.

Title Page, Item (56) in column 2 (page 9) at line 8, Under Other Publications, change "ACP" to --ACM--.

Title Page, Item (56) in column 2 (page 9) at line 66, Under Other Publications, change "Multicaset" to --Multicast--.

Title Page, Item (56) in column 2 (page 10) at line 34, Under Other Publications, change "Enviroments," to --Environments,--.

Title Page, Item (56) in column 1 (page 11) at line 20, Under Other Publications, change "SY mposium" to --Symposium--.

Title Page, Item (56) in column 1 (page 11) at line 24, Under Other Publications, change "Comunnication" to --Communication--.

Title Page, Item (56) in column 1 (page 11) at line 25, Under Other Publications, change "Oriented" to --Agent-Oriented--.

Title Page, Item (56) in column 1 (page 11) at line 47, Under Other Publications, change "Eigth" to --Eight--.

Title Page, Item (56) in column 2 (page 11) at line 4, Under Other Publications, change "Protyping" to --Prototyping--.

In column 1 at line 7 (approx.), Change "the" to --The--.

In column 10 at line 28 (approx.), Change "[<ERROR_NUM" to --[<ERROR_NUM>--.

In column 10 at line 37, Change "(USC_IP_ADDR)" to --[USG_IP_ADDR)--.

In column 12 at line 7, Change "aMAC" to --a MAC--.

In column 12 at line 42 (approx.), Change ""MAC ADDR"" to --MAC_ADDR"--.

In column 13 at line 48 (approx.), Change "tag_2" to --tag_2:--.

In column 14 at line 23 (approx.), Change "with out" to --without--.

In column 15 at line 60, Change "networks" to --networks.--.

In column 19 at line 21, Change "subscriber" to --subscriber.--.